(12) United States Patent
Ryshtun et al.

(10) Patent No.: US 8,922,527 B2
(45) Date of Patent: Dec. 30, 2014

(54) MULTI-PURPOSE STYLUS ANTENNA

(75) Inventors: Andriy Ryshtun, Lviv (UA); Jeffrey M. Boschee, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 302 days.

(21) Appl. No.: 13/421,871

(22) Filed: Mar. 16, 2012

(65) Prior Publication Data

US 2013/0207925 A1    Aug. 15, 2013

Related U.S. Application Data

(60) Provisional application No. 61/599,326, filed on Feb. 15, 2012.

(51) Int. Cl.
*G06F 3/044* (2006.01)

(52) U.S. Cl.
USPC .......................... 345/175; 345/174; 345/179

(58) Field of Classification Search
CPC .............................. G06F 3/044; G06F 3/03545
USPC .................................. 345/156, 173–177, 179
See application file for complete search history.

(56) References Cited

U.S. PATENT DOCUMENTS

| | | | |
|---|---|---|---|
| 5,768,616 A | 6/1998 | Teterwak | |
| 5,790,114 A | 8/1998 | Geaghan et al. | |
| 7,653,883 B2 | 1/2010 | Hotelling et al. | |
| 7,825,797 B2 | 11/2010 | Zawde et al. | |
| 7,884,806 B2 | 2/2011 | Trent | |
| 2001/0001430 A1* | 5/2001 | Ely et al. | 178/18.03 |
| 2002/0135568 A1* | 9/2002 | Chen | 345/173 |
| 2005/0109841 A1 | 5/2005 | Ryan et al. | |
| 2008/0149401 A1 | 6/2008 | Hagen et al. | |
| 2008/0149402 A1 | 6/2008 | Vos | |
| 2008/0309621 A1 | 12/2008 | Aggarwal et al. | |
| 2009/0051660 A1 | 2/2009 | Feland et al. | |
| 2009/0128515 A1* | 5/2009 | Bytheway | 345/174 |
| 2010/0051356 A1* | 3/2010 | Stern et al. | 178/19.04 |
| 2010/0149126 A1 | 6/2010 | Futter | |
| 2010/0265189 A1 | 10/2010 | Rofougaran | |
| 2010/0265203 A1* | 10/2010 | Rofougaran | 345/174 |
| 2010/0321325 A1 | 12/2010 | Springer et al. | |
| 2011/0007029 A1* | 1/2011 | Ben-David | 345/174 |
| 2011/0018829 A1* | 1/2011 | Peng | 345/173 |
| 2011/0163955 A1* | 7/2011 | Nasiri et al. | 345/158 |
| 2011/0316567 A1 | 12/2011 | Chai et al. | |
| 2012/0044199 A1* | 2/2012 | Karpin et al. | 345/174 |

OTHER PUBLICATIONS

International Search Report for International Application No. PCT/US12/53232 dated Nov. 16, 2012; 2 pages.
Written Opinion of the International Searching Authority for International Application No. PCT/US12/53232 mailed Nov. 16, 2012; 7 pages.

(Continued)

*Primary Examiner* — Andrew Sasinowski
(74) *Attorney, Agent, or Firm* — Lowenstein Sandler LLP

(57) ABSTRACT

Methods and apparatuses of a multi-purpose stylus antenna are described. One device includes a processing device comprising a switch, an antenna circuit, and a capacitance sensor. The switch is configured to couple a conductive element between the antenna circuit and the capacitance sensor. The processing device is configured to communicate data to or from a stylus when the switch is coupled to the antenna circuit and to measure capacitance associated with the conductive element when the switch is coupled to the capacitance sensor.

20 Claims, 22 Drawing Sheets

(56) References Cited

OTHER PUBLICATIONS

Alex Butler, et al., "SideSight: Multi-'touch' Interaction Around Small Devices", dated Oct. 19, 2008; 4 pages.

Bryce Osoinach, "Proximity Capacitive Sensor Technology for Touch Sensing Application", 12 pages.
Bury, B., "Proximity Sensing for Robots", dated Jan. 23, 1991.
Jari Hannuksela, et al., "Camera Assisted Multimodal User Interaction", 9 pages.

* cited by examiner

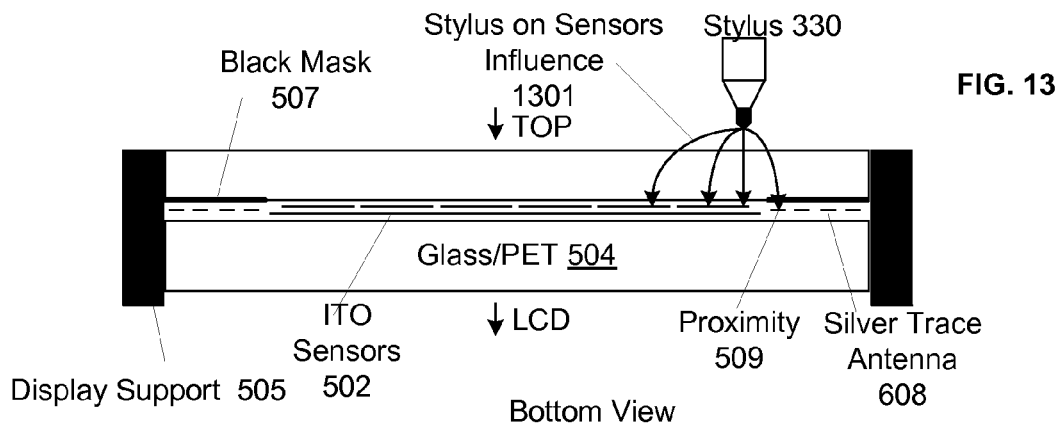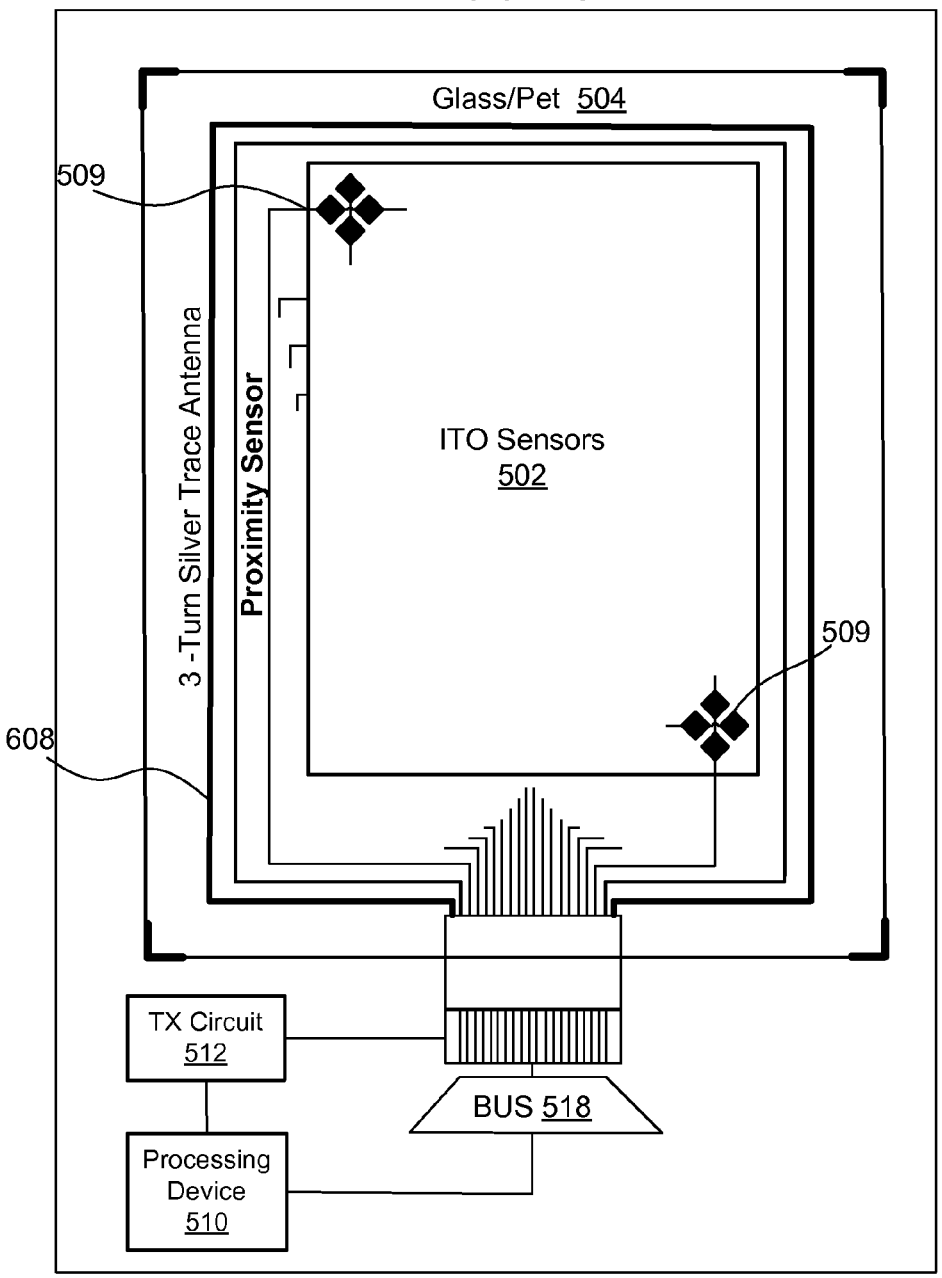
FIG. 13

MULTI-PURPOSE STYLUS ANTENNA

RELATED APPLICATIONS

This application claims the benefit of U.S. Provisional No. 61/599,326, filed Feb. 15, 2012, the contents of which are hereby incorporated by reference.

TECHNICAL FIELD

This disclosure relates to the field of user interface devices and, in particular, to capacitive sensor devices.

BACKGROUND

The use of a stylus with a touch screen interface is well established. Touch screen designs have incorporated many different technologies including resistive, capacitive, inductive, and radio frequency sensing arrays. Resistive touch screens, for example, are passive devices well suited for use with a passive stylus. The original PalmPilots® devices from the mid-1990s were one of the first successful commercial devices to utilize a resistive touch screen designed for use with a stylus and helped to popularize that technology. Although resistive touch screens can sense the input from nearly any object, multi-touch is generally not supported. An example of a multi-touch application may be applying two or more fingers to the touch screen. Another example may be inputting a signature, which may include simultaneous palm and stylus input signals. Due to these and other numerous disadvantages, capacitive touch screens are increasingly replacing resistive touch screens in the consumer marketplace.

Various tethered active stylus approaches have been implemented for use with touch screens and are found in many consumer applications such as point-of-sale terminals (e.g., the signature pad used for credit card transactions in retail stores) and other public uses. However, the need for a tethered cable is a significant drawback for private applications such as personal computers ("PCs"), smart phones, and tablet PCs.

BRIEF DESCRIPTION OF THE DRAWINGS

The present invention is illustrated by way of example, and not of limitation, in the figures of the accompanying drawings in which:

FIG. 13 illustrates one embodiment of a 3-turn silver trace configured to operate as a proximity sensor for edge protection.

DETAILED DESCRIPTION

Methods and apparatuses of a multi-purpose stylus antenna are described. One device includes a processing device comprising a switch, an antenna circuit, and a capacitance sensor. The switch is configured to couple a conductive element between the antenna circuit and the capacitance sensor. The processing device is configured to communicate data to or from a stylus when the switch is coupled to the antenna circuit and to measure capacitance associated with the conductive element when the switch is coupled to the capacitance sensor.

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Figure 1:
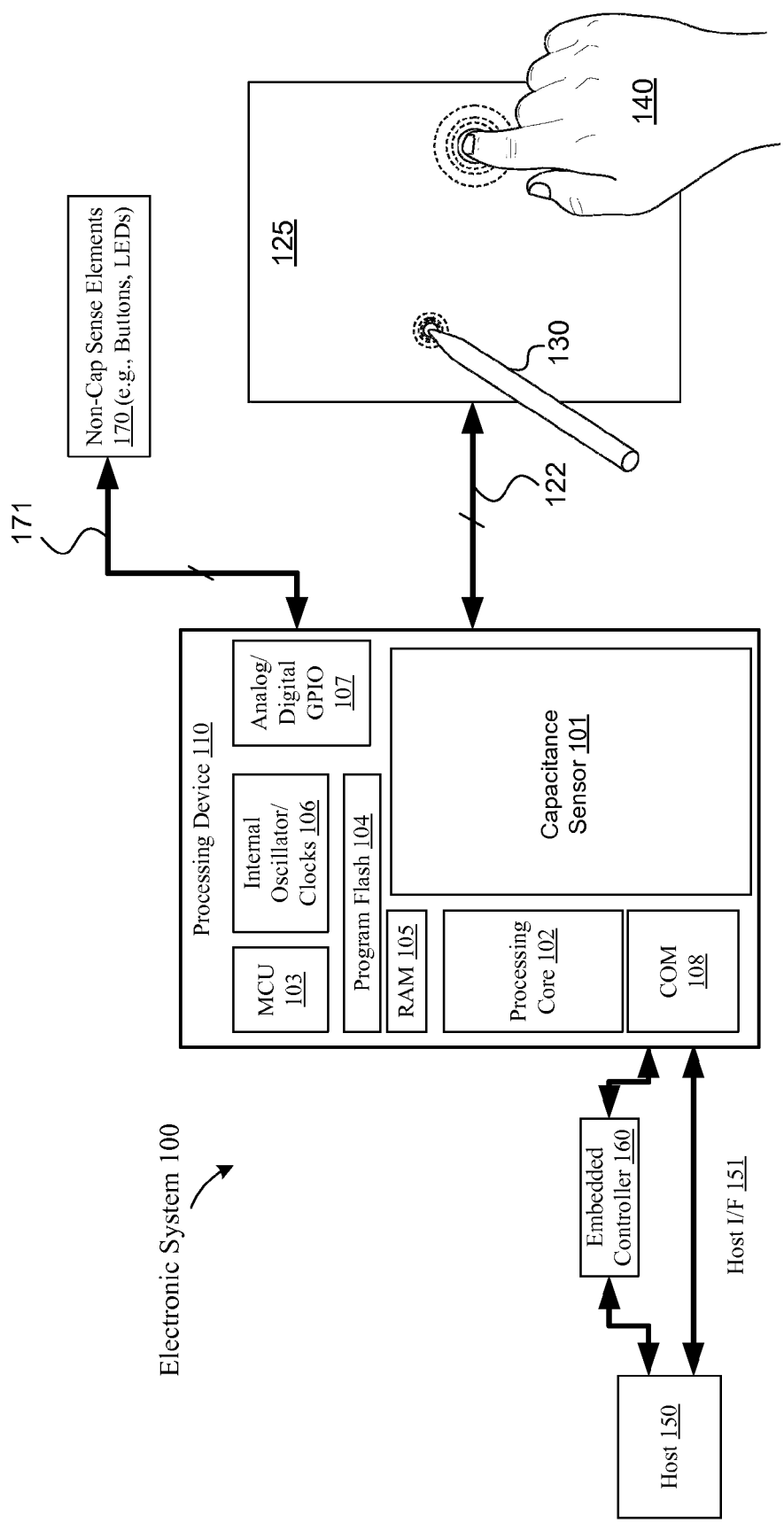
FIG. 1 is a block diagram illustrating one embodiment of an electronic system having a processing device for detecting a presence of a touch object and a stylus.

FIG. 1 is a block diagram illustrating one embodiment of an electronic system 100 having a processing device 110 for detecting a presence of a touch object 140 and a stylus 130. Electronic system 100 includes processing device 110, capacitive sense array 125, stylus 130, host processor 150, embedded controller 160, and non-capacitive sense elements 170. In the depicted embodiment, the electronic system 100 includes the capacitive sense array 125 coupled to the processing device 110 via bus 122. The capacitive sense array 125 may include a multi-dimension capacitive sense array. The multi-dimension sense array includes multiple sense elements, organized as rows and columns. In another embodiment, the capacitive sense array 125 operates as an all-points-addressable ("APA") mutual capacitive sense array. In another embodiment, the capacitive sense array 125 operates as a coupled-charge receiver. Alternatively, other configurations of capacitive sense arrays may be used. In one embodiment, the capacitive sense array 125 may be included in an ITO panel or a touch screen panel.

The operations and configurations of the processing device 110 and the capacitive sense array 125 for detecting and tracking the touch object 140 and stylus 130 are described herein. In short, the processing device 110 is configured to detect a presence of the active stylus 130 on the capacitive sense array 125, as well as a presence of the touch object 140. The processing device 110 may detect and track the active stylus 130 and the touch object 140 individually on the capacitive sense array 125. In one embodiment, the processing device 110 can detect and track both the active stylus 130 and touch object 140 concurrently on the capacitive sense array 125. In one embodiment, the active stylus 130 is configured to operate as the timing "master," and the processing device 110 adjusts the timing of the capacitive sense array 125 to match that of the active stylus 130 when the active stylus 130 is in use. In one embodiment, the capacitive sense array 125 capacitively couples with the active stylus 130, as opposed to conventional inductive stylus applications. It should also be noted that the same assembly used for the capacitive sense array 125, which is configured to detect touch objects 140, is also used to detect and track the active stylus 130 without an additional PCB layer for inductively tracking the active stylus 130 as done conventionally.

In the depicted embodiment, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). The digital block array may be configured to implement a variety of digital logic circuits (e.g., DACs, digital filters, or digital control systems) using, in one embodiment, configurable user modules ("UMs"). The digital block array may be coupled to a system bus. Processing device 110 may also include memory, such as random access memory ("RAM") 105 and program flash 104. RAM 105 may be static RAM ("SRAM"), and program flash 104 may be a non-volatile storage, which may be used to store firmware (e.g., control algorithms executable by processing core 102 to implement operations described herein). Processing device 110 may also include a memory controller unit ("MCU") 103 coupled to memory and the processing core 102.

The processing device 110 may also include an analog block array (not shown). The analog block array is also coupled to the system bus. Analog block array also may be configured to implement a variety of analog circuits (e.g., ADCs or analog filters) using, in one embodiment, configurable UMs. The analog block array may also be coupled to the GPIO 107.

As illustrated, capacitance sensor 101 may be integrated into processing device 110. Capacitance sensor 101 may include analog I/O for coupling to an external component, such as touch-sensor pad (not shown), capacitive sense array 125, touch-sensor slider (not shown), touch-sensor buttons (not shown), and/or other devices. The capacitance sensor 101 may be configured to measure capacitance using mutual capacitance sensing techniques, self capacitance sensing technique, charge coupling techniques or the like. In one embodiment, capacitance sensor 101 operates using a charge accumulation circuit, a capacitance modulation circuit, or other capacitance sensing methods known by those skilled in the art. In an embodiment, the capacitance sensor 101 is of the Cypress TMA-3xx family of touch screen controllers. Alternatively, other capacitance sensors may be used. The mutual capacitive sense arrays, or touch screens, as described herein, may include a transparent, conductive sense array disposed on, in, or under either a visual display itself (e.g. LCD monitor), or a transparent substrate in front of the display. In an embodiment, the TX and RX electrodes are configured in rows and columns, respectively. It should be noted that the rows and columns of electrodes can be configured as TX or RX electrodes by the capacitance sensor 101 in any chosen combination. In one embodiment, the TX and RX electrodes of the sense array 200 are configured to operate as a TX and RX electrodes of a mutual capacitive sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive sense array, instead of measuring a mutual capacitance at an intersection of a RX electrode and a TX electrode (a sense element) as done during mutual capacitance sensing. The capacitance sensor 101 does not use mutual capacitance or self-capacitance sensing to measure capacitances of the sense elements when performing a stylus can. Rather, the capacitance sensor 101 measures a charge that is capacitively coupled between the sense array 200 and the stylus as described herein. The capacitance associated with the intersection between a TX electrode and an RX electrode can be sensed by selecting every available combination of TX electrode and RX electrode. When a touch object, such as a finger or stylus, approaches the capacitive sense array 125, the object causes a decrease in capacitance affecting some of the electrodes. In another embodiment, the presence of the finger increases the coupling capacitance between the two electrodes. Thus, the location of the finger on the capacitive sense array 125 can be determined by identifying both the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more inputs can be determined. It should be noted that the process can calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art having the benefit of this disclosure. In addition, various types of centroid algorithms may be used to detect the center of the touch as would be appreciated by one of ordinary skill in the art having the benefit of this disclosure.

In one embodiment, the electronic system 100 includes a touch sensor pad coupled to the processing device 110 via a bus. Touch sensor pad may include a multi-dimension capacitive sense array. The multi-dimension sense array includes multiple sense elements, organized as rows and columns. In another embodiment, the touch sensor pad is an APA mutual capacitive sense array. In another embodiment, the touch sensor pad operates as a coupled-charge receiver.

In an embodiment, the electronic system 100 may also include non-capacitive sense elements 170 coupled to the processing device 110 via bus 171 and GPIO port 107. The non-capacitive sense elements 170 may include buttons, light emitting diodes ("LEDs"), and other user interface devices, such as a mouse, a keyboard, or other functional keys that do not use capacitance sensing. In one embodiment, buses 121, 122, and 171 are embodied in a single bus. Alternatively, these buses may be configured into any combination of one or more separate buses.

Processing device 110 may include internal oscillator/clocks 106 and communication block ("COM") 108. In another embodiment, the processing device 110 includes a spread spectrum clock (not shown). The oscillator/clocks block 106 provides clock signals to one or more of the components of processing device 110. Communication block 108 may be used to communicate with an external component, such as a host processor 150, via host interface ("I/F") line 151. Alternatively, processing device 110 may also be coupled to embedded controller 160 to communicate with the external components, such as host processor 150. In one embodiment, the processing device 110 is configured to communicate with the embedded controller 160 or the host processor 150 to send and/or receive data.

Processing device 110 may reside on a common carrier substrate such as, for example, an integrated circuit ("IC") die substrate, a multi-chip module substrate, or the like. Alternatively, the components of processing device 110 may be one or more separate integrated circuits and/or discrete components. In one exemplary embodiment, processing device 110 is the Programmable System on a Chip (PSoC®) processing device, developed by Cypress Semiconductor Corporation, San Jose, Calif. Alternatively, processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 110 may also be done in the host.

Capacitance sensor 101 may be integrated into the IC of the processing device 110, or alternatively, in a separate IC. Alternatively, descriptions of capacitance sensor 101 may be generated and compiled for incorporation into other integrated circuits. For example, behavioral level code describing the capacitance sensor 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance sensor 101.

It should be noted that the components of electronic system 100 may include all the components described above. Alternatively, electronic system 100 may include some of the components described above.

In one embodiment, the electronic system 100 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, and eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc) handwriting recognition, and numeric keypad operation.

Figure 2:
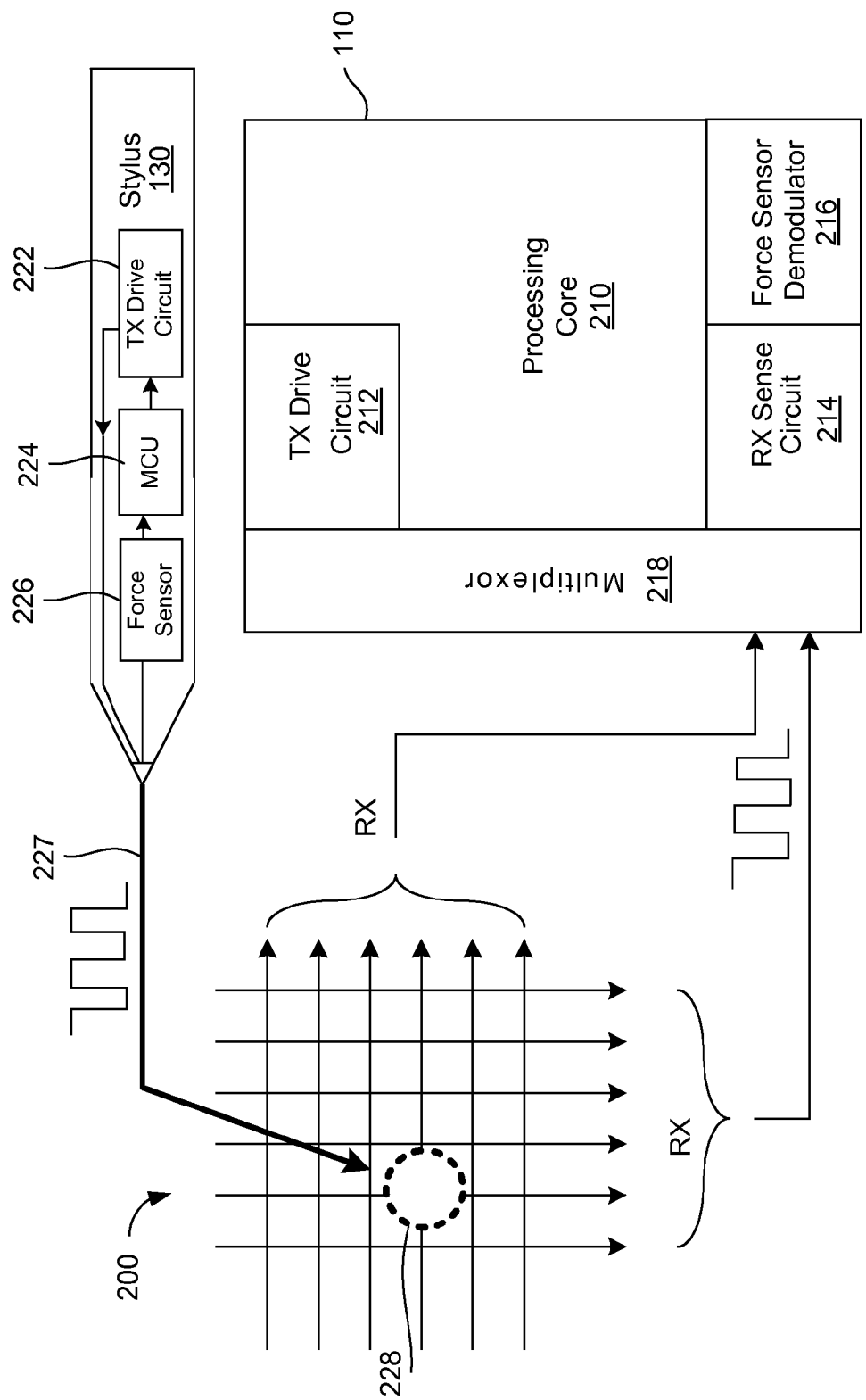
FIG. 2 is a block diagram illustrating one embodiment of a system including a capacitive sense array, a stylus, and a processing device that converts measured capacitances to touch coordinates.

FIG. 2 is a block diagram illustrating one embodiment of a system including a capacitive sense array, a stylus, and a processing device that converts measured capacitances to touch coordinates. The processing device 110 includes a processing core 210, a TX driver circuit 212, a RX sense circuit 214, a multiplexer 218, and a force sensor demodulator 216. In an embodiment, the processing core 210 is similar to the capacitance sensor 101 described above. The sense array 200 includes multiple lines that can be configured as TX lines or RX lines. For example, in one mode, the TX drive circuit 212 drives a TX signal on a first set of TX lines, and the RX sense circuit 214 measures signals on a second set of RX lines. In another mode, the TX lines are RX lines and the RX sense circuit 214 is configured to measure signals on two sets of RX lines (as illustrated in FIG. 2). These sets of RX lines can be considered as separate receive channels for stylus signal sensing. It should be noted that TX and RX lines are also referred to as TX and RX electrodes. The multiplexer 218 can be used to connect the TX lines or the RX lines to the TX drive circuit 212 or the RX sense circuit 214 based on whether the lines are being used as RX lines or TX lines.

In one embodiment, during normal finger scanning, a passive object (e.g., a finger or other conductive object) touches the sense array 200 at contact point (not illustrated in FIG. 2).

The TX drive circuit 212 drives the TX lines with a TX signal. The RX sense circuit 214 measures the RX signals on RX lines. In an embodiment, the processing core 210 determines the location of contact point based on the mapping techniques as would be appreciated by one of ordinary skill in the art having the benefit of this disclosure. Alternatively, other techniques may be used to determine the contact point. The TX lines and RX lines are multiplexed by multiplexor 630. The processing core 210 provides the TX signal on the TX lines (rows) and measures the capacitance coupling on the RX lines (columns). In an embodiment, the TX and RX lines are orthogonal and may be used interchangeably (e.g., transmitting on columns and receiving on rows). In an embodiment, the TX drive circuit 212 transmits the TX signal through a high impedance ITO panel (TX lines), thus limiting the upper frequency limit and speed of the system. The total scan time may also dependent upon the number of TX lines and RX lines in the sense array 200. For example, the TX drive circuit 212 provides a TX signal on a TX line and simultaneously reads the capacitively coupled RX signal on a RX line, according to one embodiment. In another embodiment, the RX lines 640 are multiplexed in two or more scans.

In one embodiment, during stylus scanning, the stylus TX drive circuit 222 of stylus 130 provides a TX signal 227 directly to contact point 228 on sense array 200, thus eliminating the need to dedicate the second set of RX lines (previously TX in finger scanning) to transmitting a TX signal from the TX drive circuit 212. As such, the RX sense circuit 214 measures the RX signal on both the first set of RX lines (rows) and a second set of RX lines (columns) of sense array 200. This may result in faster position tracking because the TX signal no longer passes through the high impedance ITO lines, thus reducing the scan time to the total RX measurement. The active stylus 130 includes the TX drive circuit 222, a microcontroller (MCU) 224, and a force sensor 226. In one embodiment, the processing core 210 performs a normal scan of the sense array 200 during RX sensing of TX signal from the TX drive circuit 212 (described above), and a stylus scan of the sense array 200 during RX sensing of the stylus TX signal 227 (illustrated in FIG. 2). For the stylus scan, the processing core 210 measures a charge being capacitively coupled to the row and column electrodes of the sense array from the stylus. To further illustrate, a mutual capacitance scan uses both a TX and RX signal to track an object. As described above, this is typically done by scanning the RX lines for the driven TX line in a successive fashion by the processing core 210. In an array of N rows (TX signal) and M columns (RX signal), a complete scan would perform N×M total scans if one RX line is sensed at a time. For example, transmitting a TX signal ("TX'ing") on row 1, and receiving a receive signal ("RX'ing") on columns 1-M, followed by TX'ing on row 2 and RX'ing on columns 1-M, and so on in sequential fashion. Alternatively, more RX lines can be sensed at a time. In one embodiment, 4 or 8 RX lines are sensed at a time, but in other embodiments, all RX lines may be sense simultaneously or sequentially. With multiple RX channels to sense more than one RX line at the same time, the complete scan would be (N*M)/(# RX channels). In contrast, a stylus scan may not use a TX signal by the TX drive circuit 212 and a complete scan would perform a single RX signal measurement on each row and column, or N+M scans, thus resulting in a significantly reduced stylus scanning time for the entire sense array as compared with mutual capacitance scanning time for the entire sense array. Like above, multiple RX channels can be used to sense multiple RX lines at the same time. In this case, the complete scan would be (N+M)/(# RX channels).

In the depicted embodiment, the TX driver circuit 22 generates a stylus TX signal 227 from the tip of the active stylus 130 into the touch screen. The processing core 210 senses this signal and resolves this to be the point of the active stylus 130. Synchronization between the processing core 210 sensing and the signal generated by the active stylus 130 is used to obtain correct operation, as described below with respect to FIGS. 3 and 4. In the un-tethered active stylus, this synchronization is done wirelessly. The host side (e.g., tablet side) antenna transmits a synchronization signal that is received by an antenna inside the active stylus 130. In one embodiment, the un-tethered active stylus solution uses magnetic coupling between the host and the stylus for signal transmitting. In this embodiment, the antenna design provides a uniform magnetic field across the display surface.

As described above, a passive stylus may be used as a touch object to interface with the various touch screens described above. In contrast to passive styluses, an active stylus 130 provides the transmit signal 227 (TX signal). This signal 227 may be provided to the active stylus 130 by the processing core 210 as part of the synchronization. The active stylus 130 capacitively couples the stylus TX signal 227 to the sense array 200. In an embodiment, the stylus signal amplitude, frequency, phase, etc., may be the same or similar to that which is utilized for finger sensing by the processing core 210. Alternatively, the stylus TX signal may be different than the TX signal from the TX drive circuit 212, in amplitude, frequency, and phase. In another embodiment, the stylus TX signal may have a different code for code modulation than a code used in the TX signal from the TX drive circuit 212. In an exemplary embodiment, the stylus TX signal 227 has greater amplitude than the finger sensing TX signal from the TX drive circuit 212. For example, in one exemplary embodiment, the stylus TX signal 227 ranges from approximately 20-50V, as compared with the approximately 5-10V typically provided by the processing core 210. Alternatively, other voltages may be used as would be appreciated by one of ordinary skill in the art. The higher stylus TX voltage couples more charge to the sense array 200 more quickly, thus reducing the amount of time used to sense each row and column of the sense array 200. Other embodiments may incorporate higher voltages on the sense array TX lines to obtain similar time efficiency improvements for finger sensing.

In an embodiment, the active stylus 130 applies a higher frequency on the stylus TX signal 227 than the TX signal frequency from TX drive circuit 212 to achieve a reduced sensing time. Charge may be capacitively coupled from the active stylus 130 to the sense array 200 during the rising and falling edges of the stylus TX signal 227. Thus, a higher TX frequency provides a greater number of rising and falling edges over a given period of time, resulting in greater charge coupling. The practical upper limit of the TX frequency in finger sensing mode (e.g., TX signal on sense array 200 for finger sensing) is dependent upon the resistor-capacitor ("RC") time constant of the panel's individual sense elements and interconnect (not shown). This is typically due to high impedance materials (e.g. ITO) used in the fabrication of the sense array 200. A high-impedance sense array (e.g., sense array 200) may result in a high time constant and resulting signal attenuation of the rows (TX lines) and columns (RX lines) of sense elements, which may limit the maximum sensing frequency. When using an active stylus to transmit the stylus TX signal 227 directly to a contact point 228 on sense array 200, the stylus TX signal 227 does not pass through the high impedance path, and therefore the maximum operating frequency for the stylus TX signal 227 can be increased. For example, the time constant of the RX traces (both rows and columns) may be used to determine an upper frequency limit, but this will typically be is at least double the upper frequency limit used in finger sensing. Typically the impedance is half to the impedance when performing mutual capacitance scanning, since the row's impedance is eliminated and the column's impedance remains (or vice versa). It should be noted that both finger sensing and stylus sensing use frequency selection where the operation period should be smaller than the panel's time constant; so, restrictions for the operation frequency selection are approximately the same for finger and stylus sensing.

Although the RX lines (electrodes) appear as lines in FIG. 2, these lines may represent bars or elongated rectangles or other tessellated shapes such as diamonds, rhomboids, and chevrons. Alternatively, other useable shapes may be used as would be appreciated by one of ordinary skill in the art having the benefit of this disclosure.

Figure 3:
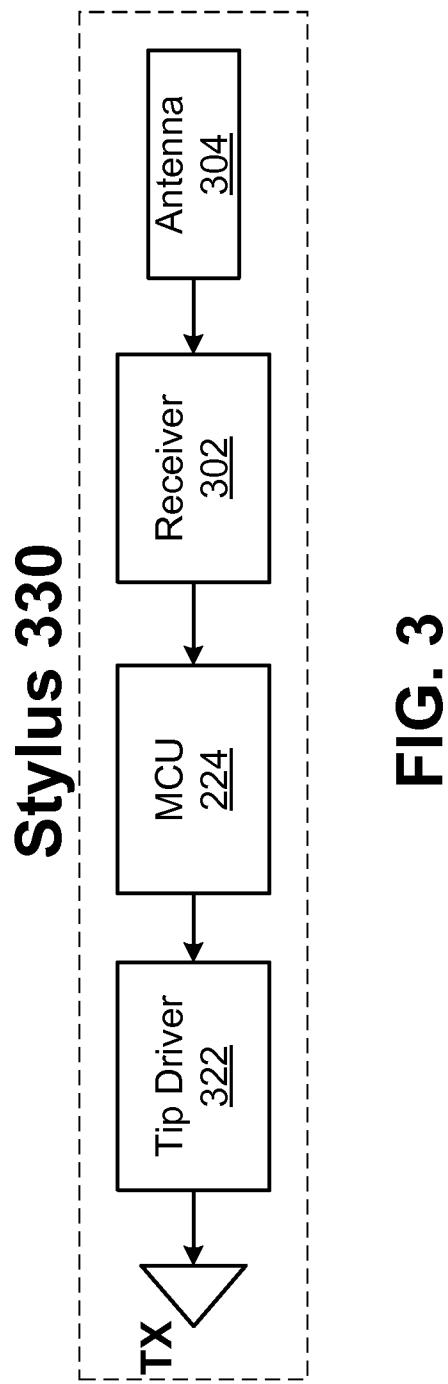
FIG. 3 is a block diagram illustrating one embodiment of a stylus configured to synchronize to a host.

FIG. 3 is a block diagram illustrating one embodiment of a stylus 330 configured to synchronize to a host. The stylus 330 includes the TX drive circuit 322 (also referred to as a tip driver), the controller 224, a receiver 302, and an antenna 304. The host (illustrated and described below with respect to FIG. 4) generates a TX signal and transmits the TX signal to the stylus 330. The signal can be transmitted by radio, inductively, optically, or other methods of communication. The receiver 302 receives the TX signal via the antenna 304 and the receiver 302 can send the TX signal to the CONTROLLER 224 to be transmitted by the stylus tip via the TX drive circuit 222. In one embodiment, the receiver 302 receives the TX signal through the antenna 304 at 13.56 MHz. Alternatively, other frequency and other communication mediums may be used as would be appreciated by one of ordinary skill in the art having the benefit of this disclosure.

In an embodiment, the stylus 330 is powered by battery voltage. The battery voltage may be provided by battery cells (e.g., 1.5V AAA cells). A booster (not illustrated) may boost the battery voltage delivered to a tip driver 323 (e.g., a TX driver circuit 222), allowing the tip driver 322 to amplify the TX signal to a higher voltage (e.g., 10V-20V). A high voltage stylus TX signal may enable the host 400 to detect the stylus 330 when it is "hovering," or in close proximity to the ITO panel 420, but not physically touching an overlay disposed over the ITO panel 420. A high voltage stylus TX signal may also provide for faster and more robust detection by the host 400.

Figure 4:
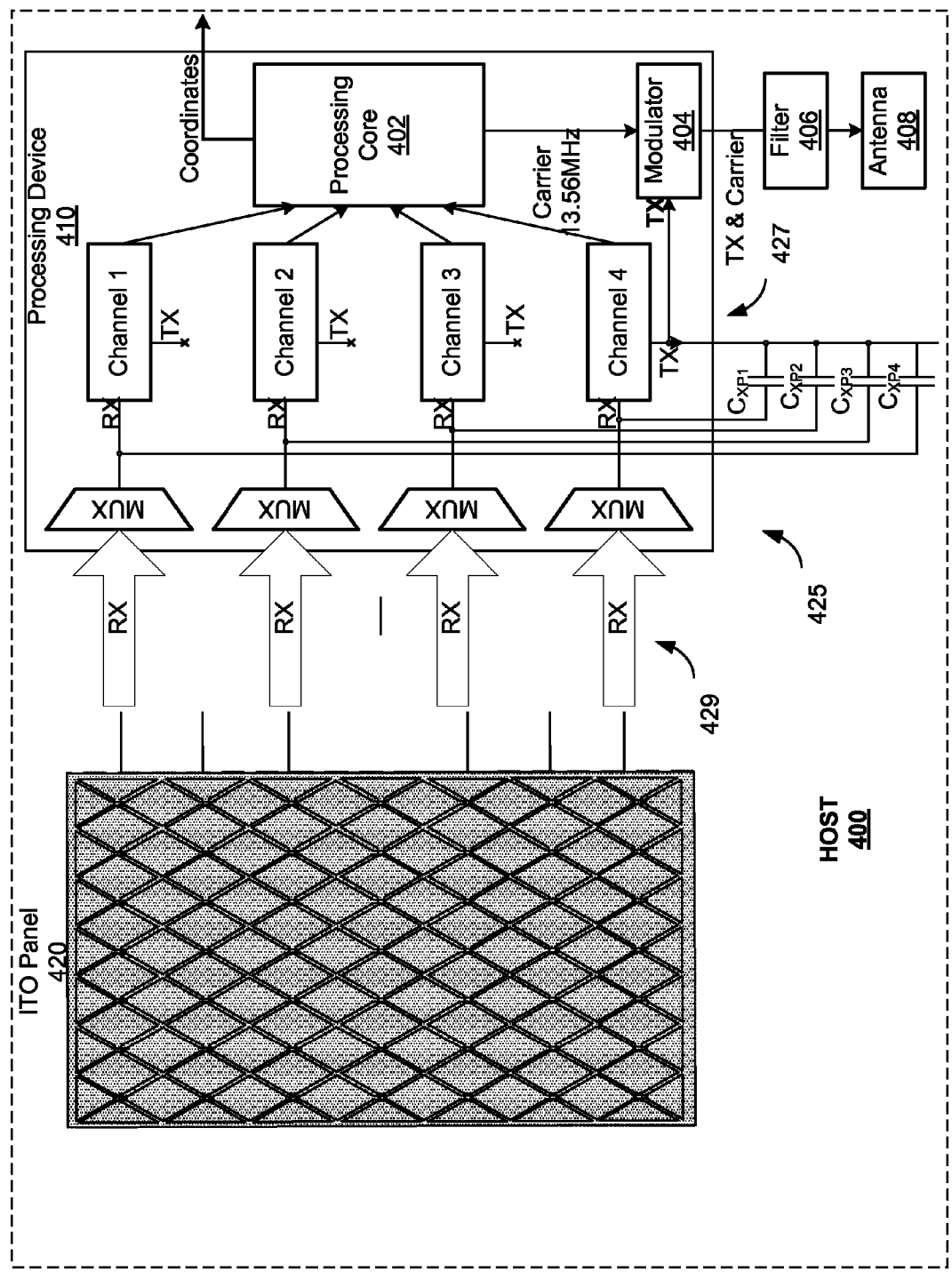
FIG. 4 is a block diagram illustrating one embodiment of a host configured to synchronize to a stylus.

FIG. 4 is a block diagram illustrating one embodiment of a host 400 configured to synchronize to a stylus. The host 400 includes an ITO panel 420, processing device 410, a filter 406, and an antenna 408. The processing device 410 includes multiplexor devices ("MUXs") 425, multiple RX channels 427, a processing core 402, and a modulator 404. The ITO panel 420 is composed of rows and columns of electrodes. In an embodiment, the rows and column are the TX lines and RX lines 429. The rows and columns are coupled to the MUXs 425, respectively. MUXs 425 are coupled to the RX channels 427, which are coupled to the processing core 402. The processing core 402 is coupled to the modulator 404. In an embodiment, the processing core 402 performs similar functions as described above with respect to processing device 110 or capacitance sensor 101. In another embodiment, the processing core performs the operations described above with respect to the processing core 210 of FIG. 2.

In an embodiment, the processing device 410 generates and couples a TX signal to a transmitter. The transmitter wirelessly couples the TX signal to a receiver of the stylus (antenna 304 of stylus 330). In one embodiment, the transmitter inductively couples the TX signal to the receiver 302. In other embodiments, the transmitter may wirelessly couple the TX signal in a variety of ways including radio frequency, optical, ultrasound, and other mediums that would be appreciated by one of ordinary in the art. The receiver 302 receives TX signal from the transmitter and couples demodulated TX signal to the stylus for driving the TX signal at the stylus tip as described above.

In the depicted embodiment, the processing device 410 generates and couples a TX signal to the modulator 404, which receives a carrier signal (e.g., 13.56 MHz, which is the radio-frequency identification (RFID) standard) from the processing core 402, whereas the TX signal may have a lower frequency than the carrier signal (e.g., approximately 100 kHz to 500 kHz). The modulator 404 modulates the TX signal with the carrier signal, and sends the modulated signal to the filter 406, which filters out any unwanted frequencies on the modulated TX signal. For example, a high pass or band pass filter may be used to remove unnecessary noise or harmonics in the modulated TX signal. The filter 406 sends the signal via the antenna 408 to the receiver 302 of the stylus 330. The modulator 404 may modulate the TX signal using amplitude shift-keying (ASK), frequency shift keying (FSK), phase-shift keying (PSK), binary phase shift keying (BPSK), or other modulation schemes as would be appreciated by one of ordinary skill in the art having the benefit of this disclosure.

In one embodiment, the antenna 408 is an antenna coil that wirelessly broadcasts the filtered and modulated TX signal 925. In an embodiment, the antenna coil may broadcast the modulated TX signal in a variety of formats including, but not limited to, radio frequency ("RF"), inductance, optics, electrostatic coupling, and ultrasound. In one embodiment, the transmitter modulates the TX signal with an RF carrier wave (e.g., 433 MHz, 900 MHz, or 2.4 GHz). In another embodiment, the transmitter utilizes an inductive link to inductively couple the lower frequency RFID modulated carrier wave (modulated TX signal) to the inductive receiver. Inductively coupling an RFID carrier frequency generally consumes less power than an RF carrier wave and may provide longer battery life in the stylus. In some embodiments, using an RFID carrier frequency may provide significant advantages. For example, there are no broadcast licensing requirements associated with broadcasting RFID frequencies worldwide. Furthermore, at RFID frequencies, the metal stylus case and stylus tip may function as additional electric field antennas, providing for a more robust receiver block. In one embodiment, the RFID carrier frequency is frequency divided to generate the TX signal, thus providing good noise suppression at the receiver block.

In one embodiment, the TX signal sent by the antenna 408 is the same signal as the TX signal generated and applied to the ITO panel 420 on the TX lines during finger position tracking. Alternatively, the TX signal may be a different signal than the TX signal generated and applied to the ITO panel 420 and may have different signal characteristics (e.g., different frequency, phase, or code modulation). In another embodiment, the processing device 410 sends a synchronization signal, or timing data, whereby the stylus 330 generates the stylus TX signal based on the synchronization signal received by the receiver 302 from the host 440. In an embodiment, the synchronization signal has different signal characteristics than the TX signal generated and applied to the ITO panel 420 during finger position tracking.

The stylus 330 capacitively couples the amplified stylus TX signal from the stylus tip to the ITO panel 420. The rows and columns of electrodes (configured as RX lines 429 in stylus position tracking mode) sense the stylus TX signals and send the received stylus TX signals to the processing core 402 via MUXs 425 and the RX channels 427. In an embodiment, the stylus TX signals are referred to as RX signals once they are sensed by the rows and/or columns of electrodes on the ITO panel 420. In an embodiment, the processing device 410 performs a stylus scan of the rows and columns of ITO panel 420 when sensing the stylus TX signal. The processing device 410 determines the location of the stylus 330 based on the relative strength of the TX signal on the rows and columns elements of the ITO panel 420

The synchronized operation of the host 400 and stylus 330 enables the processing device 410 to substantially simultaneously track a passive touch object (e.g., finger) and stylus 330 on the ITO panel 420. Synchronization ensures that the stylus 330 transmits a stylus TX signal during a period when the processing device 410 is not TX'ing for passive touch object sensing.

In an alternative embodiment, the stylus 330 is configured to operate as the timing "master," and has a transmitter similar to transmitter of the host to send synchronization information to the host, which would include a receiver similar to receiver 302. In another embodiment, the stylus, the host, or both may include transceivers that allow for bi-directional communication. It should be noted that the communication between the host and the stylus for synchronization is done on a communication channel or communication link. The communication channel or link may be considered a backchannel that is used to communication data between the host and stylus. The communication data may include synchronization information as described herein, as well as additional data, such as force data, button data, or the like. The communication channel or link may be a RF link, Bluetooth link, an optical link, an infrared (IR) link, or other communication channels/links as would be appreciated by one of ordinary skill in the art having the benefit of this disclosure. When the stylus 330 operates as the timing "master," the stylus 330 sends the carrier modulated TX signal to the host. A carrier generator, frequency divider, and modulator on stylus 330 provides a modulated TX signal to the host, where the host is synchronized to operate at the same phase and frequency as the stylus TX signal. The modifications to the system needed to synchronize the host to a master stylus TX signal would be appreciated by one having ordinary skill in the art with the benefit of this disclosure.

In one embodiment, the antenna 408 is a single turn coil. In another embodiment, the antenna 408 is a multi-turn coil antenna, such as a 2-turn coil, or a 3-turn coil antenna (illustrated in FIG. 5). In another embodiment, the antenna 408 is made up of one or more traces, such as silver traces, disposed on a printed circuit board or on a substrate of an ITO panel. In one embodiment, the antenna 408 is a 3-turn sliver trace antenna (illustrated in FIG. 6).

Figure 5:
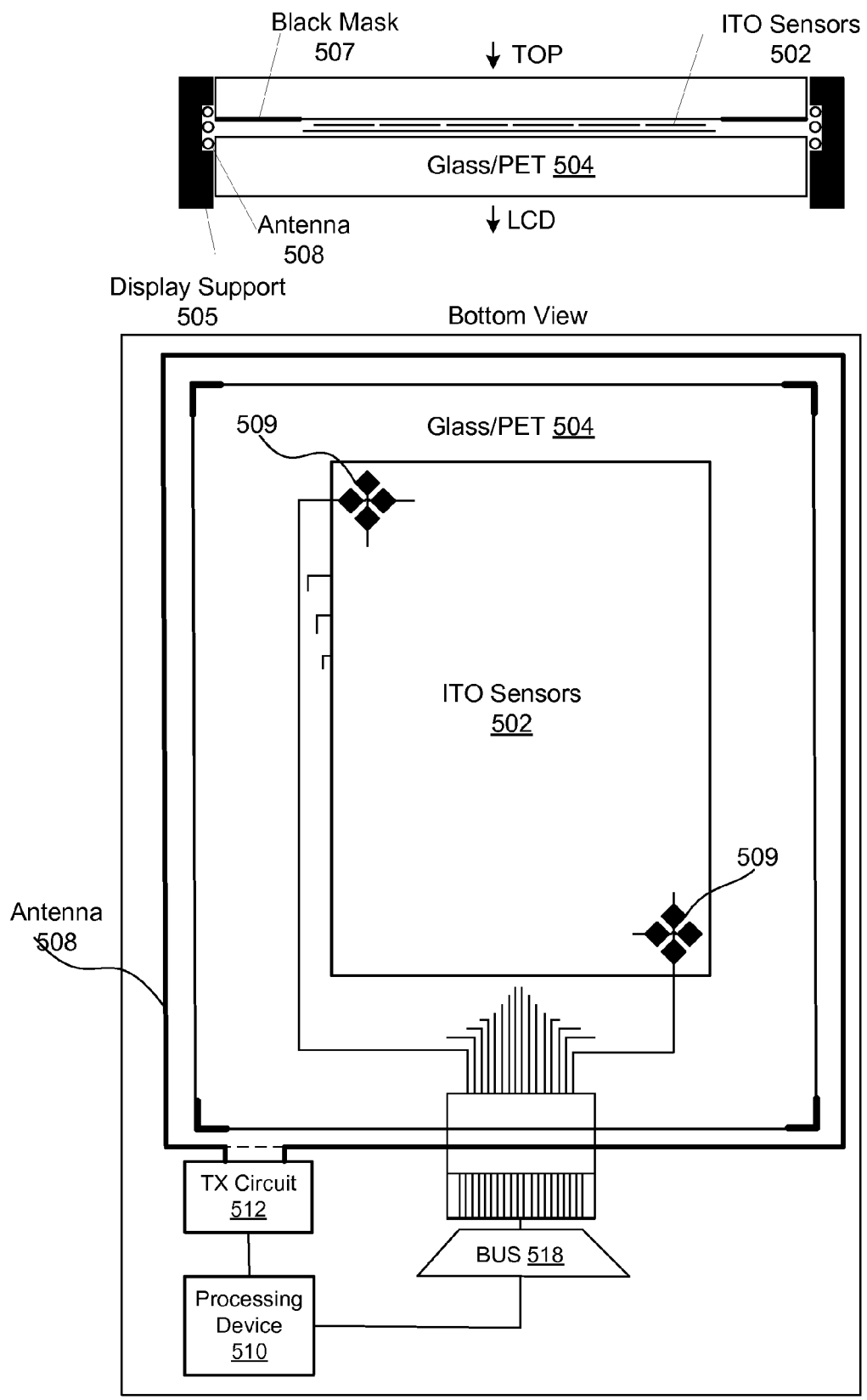
FIG. 5 illustrates one embodiment of a 3-turn coil disposed around an Indium Tin Oxide (ITO) panel to operate as a stylus antenna in a first mode and as an additional capacitive sense element in a second mode.

FIG. 5 illustrates one embodiment of a 3-turn coil antenna 508 disposed around an ITO panel to operate as a stylus antenna in a first mode and as an additional capacitive sense element in a second mode. The 3-turn coil antenna 508 includes a radiating element disposed around the ITO panel of ITO sensors 502. The 3-turn coil antenna 508 may be disposed within a display support 505, such as in an opening, that supports a glass substrate or Polyethylene terephthalate (PET) substrate (labeled as glass/PET 504) and the ITO sensors 502. The glass/PET 504 may be disposed above a liquid crystal display (LCD) and a black mask 507 may be disposed to delineate a viewing area of the LCD. The coils of the 3-turn coil antenna 508 may stack vertically as shown in FIG. 5. Alternatively, the 3-turn coil antenna 508 can be disposed in other ways as would be appreciated by one of ordinary skill in the art having the benefit of this disclosure.

In one embodiment, the 3-turn coil antenna 508 is a conductive element that can be used different in different modes. In one embodiment, in a first mode, the 3-turn coil antenna 508 is configured to operate as the stylus antenna to communicate with a stylus, such as to synchronize the stylus. In a second mode, the 3-turn coil antenna 508 is configured to operate as an additional capacitive sense element. The additional capacitive sense element can be used for grip protection, edge protection and correction, face down detection, or other operations as described herein. In FIG. 5, the 3-turn coil antenna 508 includes a radiating element disposed around the ITO sensors 502. The 3-turn coil may be a wire that makes multiple turns around the display, such as in the display support 505. The wire width is not critical and can be in range 0.2-0.5 mm, for example. The typical coil inductance is in the range of 2 uH-15 uH, and the Q factor could be 5 or higher. Alternatively, other wire widths may be used based on the dimensions of the device, as well as other inductances and Q factors as would be appreciated by one of ordinary skill in the art having the benefit of this disclosure. The antenna (e.g., coil antenna 508), in the first mode, is used by the host for synchronization signal transmitting. As described in more detail below the same conductive element (e.g., coil antenna 508) can be used for another purpose as an additional capacitive sense element. For example, the conductive element, 3-turn coil, can be used as a proximity sensor. This proximity sensor may be used in place of, or in addition to, the proximity sensors 509.

In FIG. 5, the host includes a processing device 510, TX circuit 512, and a bus 518. The processing device 510 uses the bus 518 to drive and sense the ITO sensors 502, as well as one or more proximity sensor 509. The processing device 510 can also use a TX circuit 512 to transmit information on the 3-turn antenna coil antenna 508 to the stylus 330. The TX circuit 512 may include a modulator, an amplifier, a filter, or other components to transmit a TX signal or other type of signal to the stylus as described herein.

Figure 6:
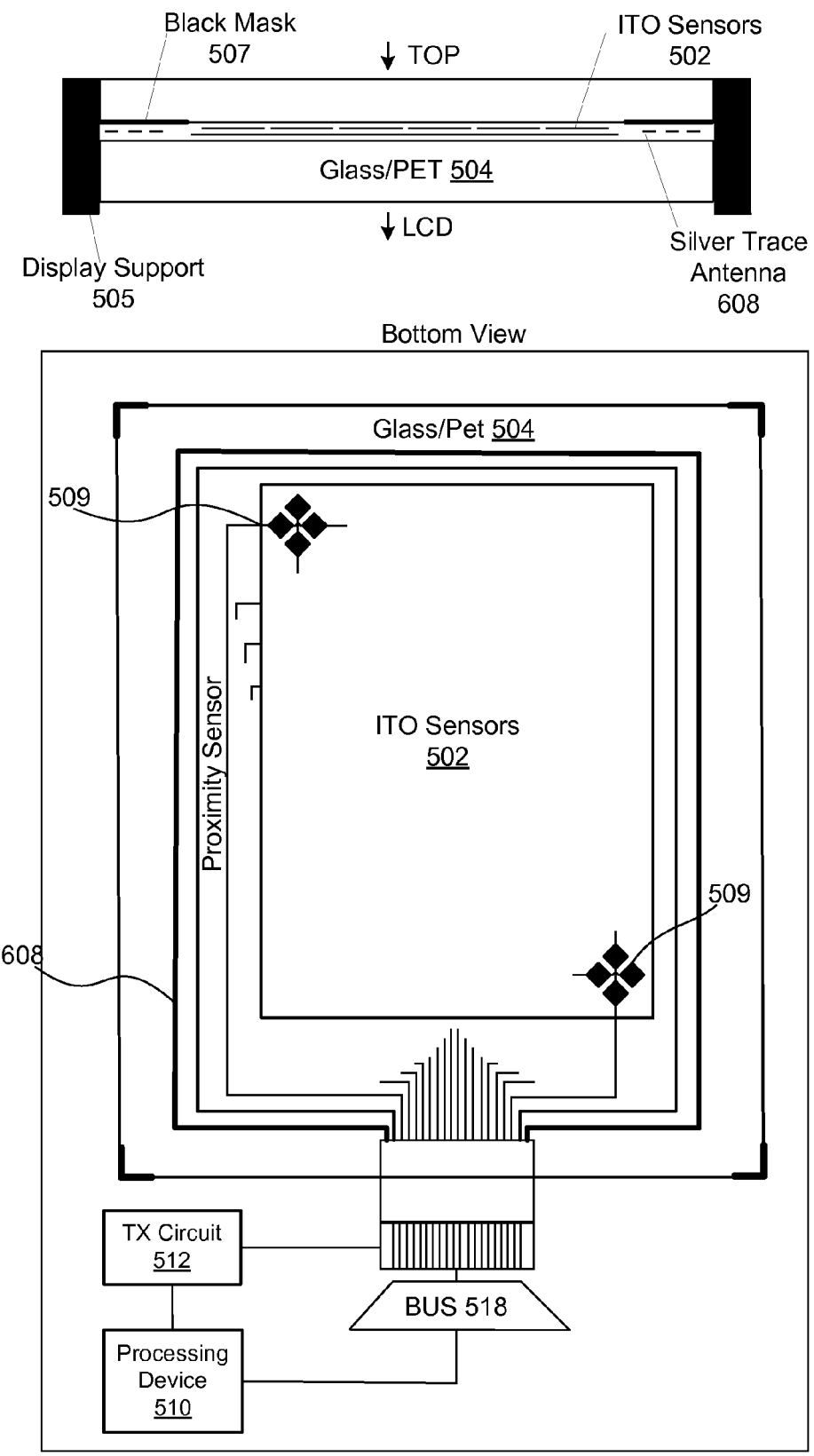
FIG. 6 illustrates one embodiment of a 3-turn silver trace disposed on an ITO panel to operate as a stylus antenna in a first mode and as an additional capacitive sense element in a second mode.

In another embodiment, a device includes a capacitive sense array that has multiple sense elements. These sense elements are configured to detect a conductive object proximate to the capacitive sense array. The device also includes a conductive element disposed adjacent to the capacitive sense array. The conductive element is configured to operate as an antenna in a first mode of the device and as an additional capacitive sense element in a second mode of the device. In yet a further embodiment, the antenna is a stylus antenna. The stylus antenna includes a radiating element disposed around at least a portion of the capacitive sense array. The stylus antenna may be a coil disposed around the capacitive sense array. This coil may be a one-, two-, three-turn coil, such as the 3-turn coil antenna 508 illustrated in FIG. 5. The coil may also be more than three coils. In another, the stylus antenna includes one or more conductive traces disposed on a common substrate as the sense elements of the sense array, such as illustrated in FIG. 6 where the conductive traces are 3-turn silver trace 608 disposed on the common substrate as the ITO sensors. In the second mode, the conductive element can be configured to operate as a proximity sensor. This proximity sensor may be used in place of typically proximity sensors used in the device, or in addition to these proximity sensors.

In another embodiment, a device includes a processing device that includes a switch, an antenna circuit, and a capacitance sensor. The switch is configured to couple a conductive element between the antenna circuit and the capacitance sensor. The processing device is configured to communicate data to or from a stylus when the switch is coupled to the antenna circuit and to measure capacitance associated with the conductive element when the switch is coupled to the capacitance sensor. In yet a further embodiment, the device further includes an ITO panel including ITO sensors coupled to the processing device. The processing device is configured to detect a conductive object proximate to the ITO sensors. The device further includes the conductive element that is disposed at least partially around the ITO sensors.

FIG. 6 illustrates one embodiment of a 3-turn silver trace 608 disposed on an ITO panel to operate a stylus antenna in a first mode and as an additional capacitive sense element in a second mode. The 3-turn silver trace 608 is disposed on the ITO panel of ITO sensors 502 itself. In one embodiment, the 3-turn silver trace 608 is disposed on a common substrate as the ITO sensors 502. The common substrate may be the glass/PET 504. The coils of the 3-turn silver trace 608 may be disposed horizontally as shown in FIG. 6. Unlike the 3-turn coil antenna 508 that is disposed around the display, the 3-turn silver trace 608 is disposed as part of the display stack. Thus, the display support 505 does not have an opening in which the 3-turn coil antenna 508 may be disposed. In the depicted embodiment, the 3-turn silver trace 608 is disposed around the ITO proximity sensors 509. Also, the 3-turn silver trace 608 can be disposed below the black mask 507. In one embodiment, the 3-turn silver trace 608 is placed around the display 1 mm from the silver traces that connect the ITO sensors 502 to a Flexible Printed Circuit Board (FPC) connection. The 1 mm between antenna and the silver traces is recommended to prevent influence on the silver traces of the ITO sensors 502. In one embodiment, each turn of the 3-turn silver trace 608 terminates in the FPC connection pads; therefore, full loops are not realized on the ITO panel. The full loops are realized by the connection of these turns on the FPC to form the antenna. Alternatively, the 3-turn silver trace 608 can be disposed in other ways as would be appreciated by one of ordinary skill in the art having the benefit of this disclosure. It should also be noted that other conductive traces can be used for the conductive element.

In one embodiment, the 3-turn silver trace 608 is a conductive element that can be used different in different modes. In one embodiment, in a first mode, the 3-turn silver trace 608 is configured to operate as the stylus antenna to communicate with a stylus, such as to synchronize the stylus. In a second mode, the 3-turn silver trace 608 is configured to operate as an additional capacitive sense element. The additional capacitive sense element can be used for grip protection, edge protection and correction, face down detection, or other operations as described herein. In FIG. 6, the 3-turn silver trace 608 is one or more conductive traces disposed around the conductive traces of the ITO sensors 502. The 3-turn silver trace 608 may be silver or other metal disposed on the substrate of the ITO penal. Different dimensions of the conductive traces could be used as would be appreciated by one of ordinary skill in the art having the benefit of this disclosure. The stylus antenna (e.g., silver trace antenna 608), in the first mode, is used by the host for synchronization signal transmitting. As described in more detail below the same conductive element of the stylus antenna, can be used for another purpose as an additional capacitive sense element. For example, the conductive element, 3-turn silver trace 608, can be used as a proximity sensor. This proximity sensor may be used in place of, or in addition to, the ITO proximity sensors 509.

As described in more detail below, there are at least four use cases in which the conductive element can be used for different purposes in different modes. For example, the conductive element that is used for the stylus antenna may also be used for: 1) Grip Protection; 2) Edge Protection; 3) Edge Correction; and 4) Face Down Detection.

In one embodiment, the device described above that has a capacitive sense array and a conductive element that can be configured to operate as an antenna in a first mode and as an additional capacitive sense element in a second mode, can include a processing device that is coupled to the sense array and the conductive element. In one embodiment of grip protection, the processing device is configured to use the proximity sensor (conductive element) in the second mode to initiate a grip detection algorithm when the processing device detects the conductive object proximate to a periphery area adjacent to the capacitive sense array in which the proximity sensor is disposed. In one embodiment of edge protection, the processing device is configured to use the proximity sensor in the second mode for edge protection to prevent reporting touch coordinates of the conductive object when the processing device detects the conductive object proximate to a periphery area adjacent to the capacitive sense array in which the proximity sensor is disposed. In one embodiment of edge correction, the processing device is configured to use the additional capacitive sense element in the second mode for edge correction when the processing device detects the conductive object proximate to a periphery area adjacent to the capacitive sense array in which the proximity sensor is disposed. In one embodiment of face down detection, the device also includes a display and a second proximity sensor, and the processing device is configured to use the proximity sensor and the second proximity sensor in the second mode for face-down detection to turn off the display when the processing device determines that a mutual capacitance between the proximity sensor and the second proximity sensor is above a first threshold or below a second threshold.

Figure 7:
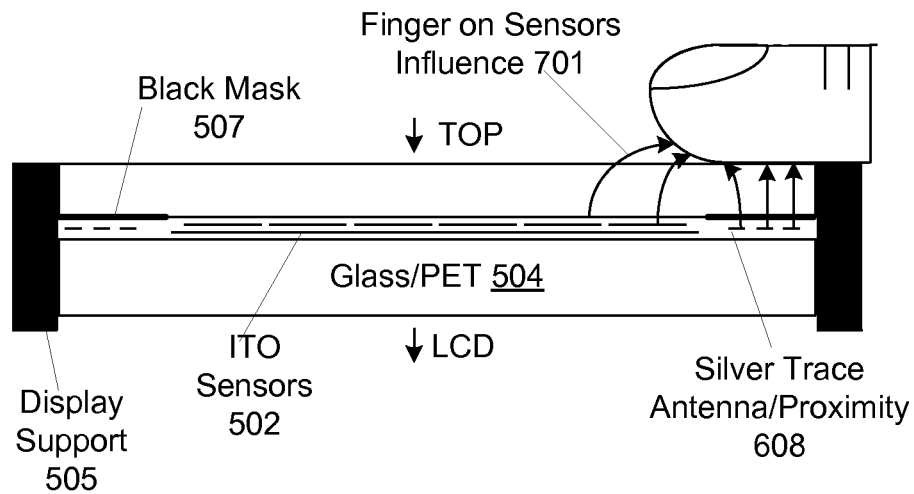
FIG. 7 illustrates one embodiment of a stylus antenna operating as a proximity sensor.

FIG. 7 illustrates one embodiment of a stylus antenna operating as a proximity sensor. The sliver trace antenna 608 (or the 3-turn coil antenna 508) can be configured to operate as a proximity sensor. The proximity sensor could be used for grip protection. The "grip protection" feature should disable touch screen operation in the gripped area when a user grips the device housing the touch screen (e.g., a tablet or other mobile device) in a black mask area that delineates a viewing area of the touch screen. The grip is detected when a finger on sensors influence 701 is present.

Figure 25:
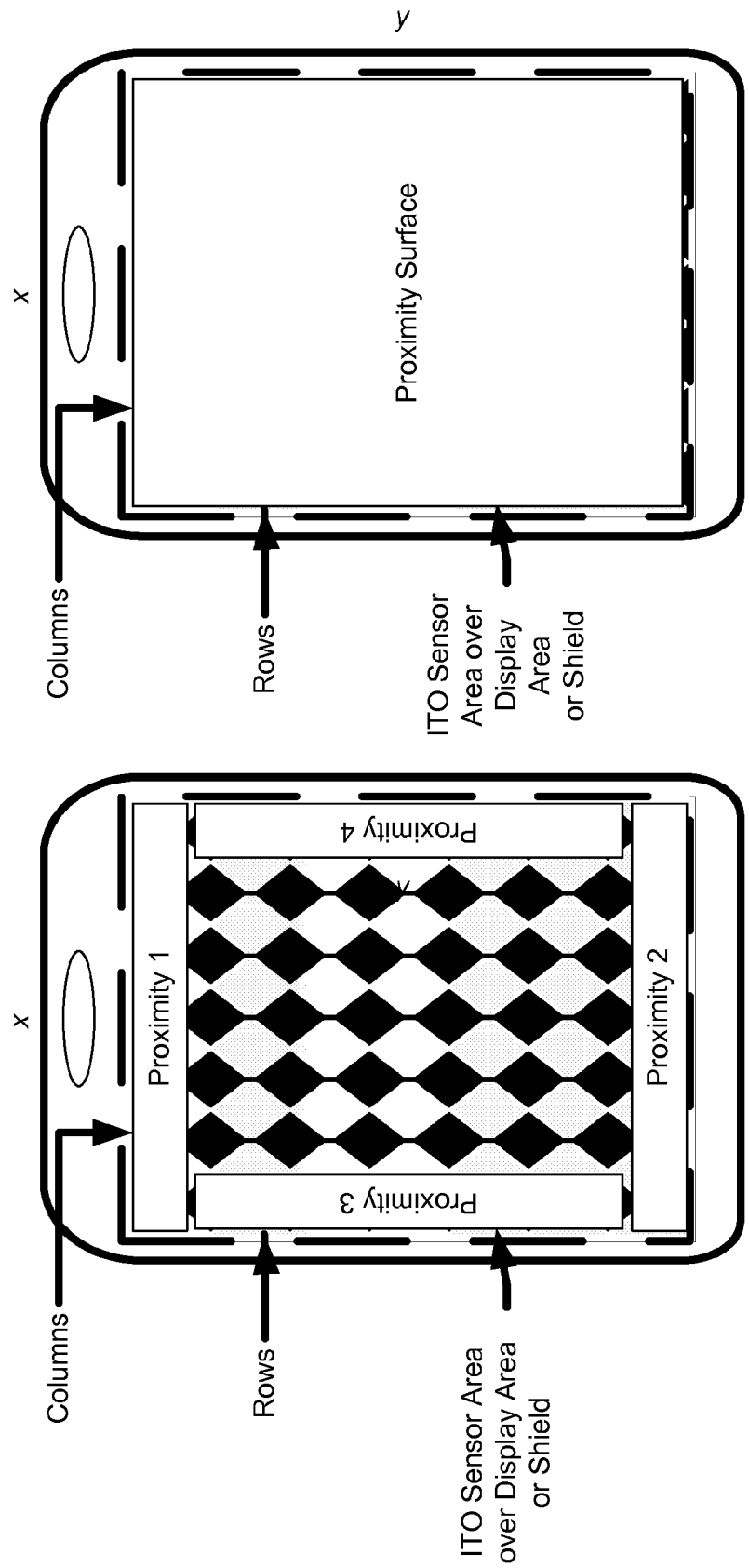
FIG. 25 illustrates proximity sensing areas for grip protection according to one embodiment.

Grip detection may be realized using additional ITO sensors, considered hidden sensors that are disposed below the black mask area and disposed around the ITO sensors for the visible area of the touch screen. The processing device could scan the entire screen or some panel zones to get signals for grip protection algorithm, such as illustrated in FIG. 25. As shown in FIG. 25, an entire surface could be used as a proximity surface or four zones at the edges of the device could be used as 4 separate proximity zones of the ITO panel to detect grips. For example, the corner left and right ITO strips are used as proximity sensors. Two scans are done to get signals from them. The "Proximity 1" and "Proximity 2" sensors are scanned first and the "Proximity 3" and "Proximity 4" are scanned after them. The 4 proximity zones allow detecting some grip touch. It should be noted that these scans would be in addition to the scans of the ITO panel for normal touches. Scanning the entire panel may allow for better sensitivity. The data from neighbor sensors can be integrated to get better SNR. But may use more time and can increase total scanning time.

However, in the depicted embodiment of FIG. 7, the stylus antenna is used as a proximity sensor. For example, if the user grips the screen, as sown as the finger on sensors influence 701, then proximity sensor detects it and the host stops coordinates reporting or executes a grip protection algorithm. Although FIG. 7 illustrates the silver trace antenna 608, similarly, the coil antenna 508 can detect the finger influence 701 and stop coordinate reporting or execute a grip protection algorithm.

Figure 8:
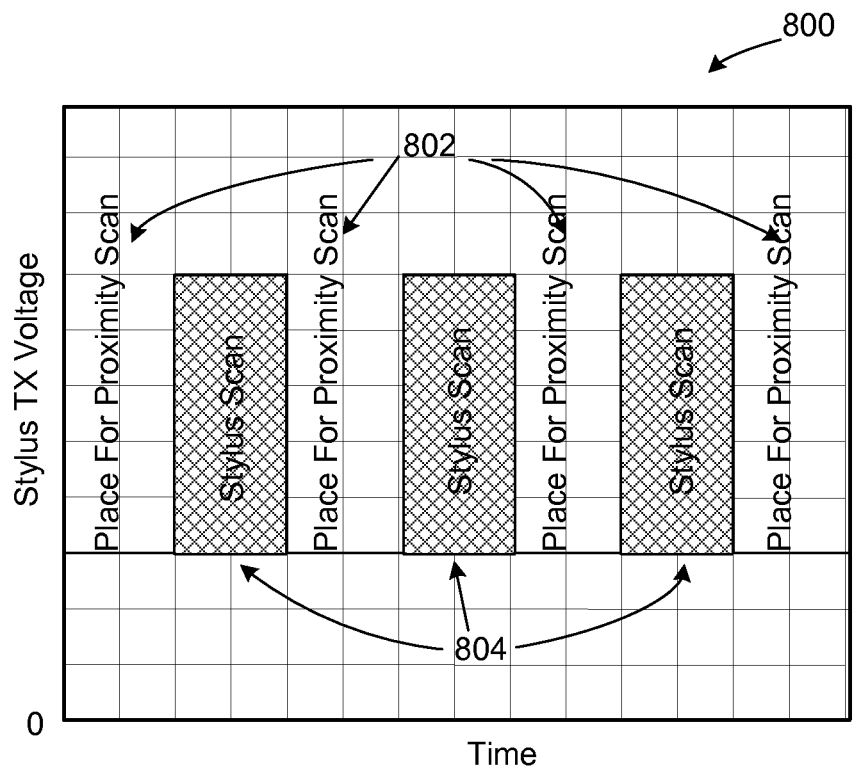
FIG. 8 is a graph illustrating a signal from the stylus antenna over time according to one embodiment.

FIG. 8 is a graph 800 illustrating a signal from the stylus antenna over time according to one embodiment. Graph 800 shows the stylus TX signal voltage over time on the conductive element that is used as the stylus antenna in the first mode and as a proximity sensor in the second mode. As shown in FIG. 8, the TX signal is on during stylus scans 804, creating openings 802 for proximity scans of the same conductive element for another purpose. The stylus antenna is not being used during these times and is available for other purposes, such as proximity sensing. In effect, the stylus scans 804 represent the first mode, and the openings 802 represent the second mode.

In another embodiment, the proximity senor can be scanned simultaneously with an APA scan. Alternatively, if not scanned simultaneously with an APA scan or during pauses between stylus scans, the proximity sensor could be scanned less frequently in the background.

Figure 9:
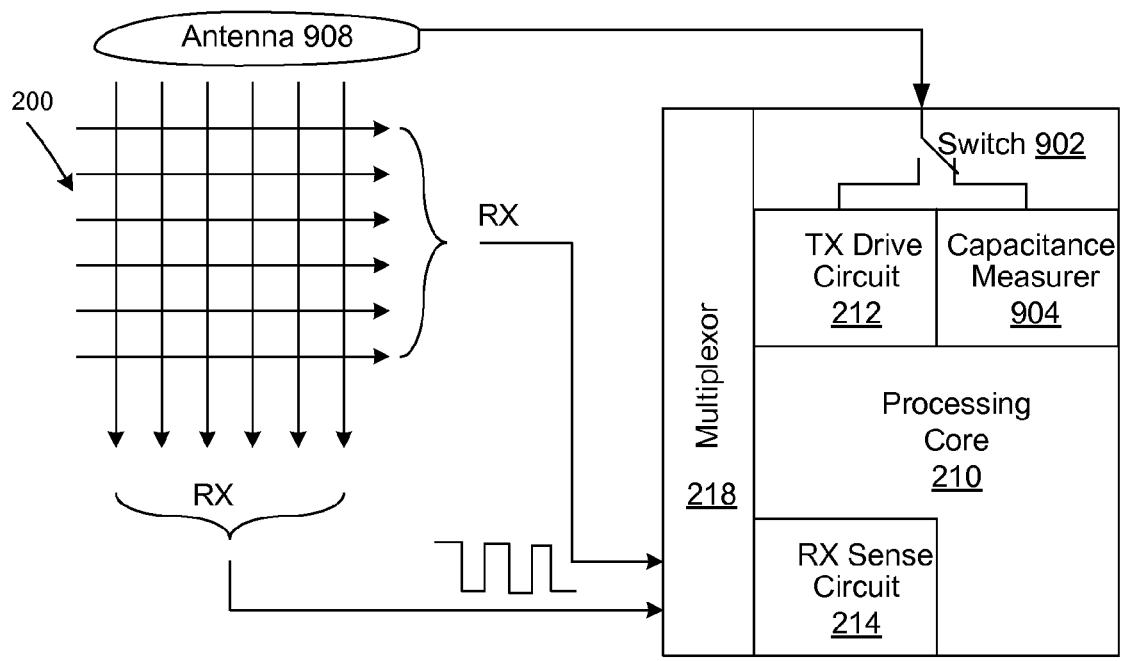
FIG. 9 illustrates a block diagram of the processing device of FIG. 2 with a switch coupled between the antenna to the TX drive circuit and the capacitance measurer according to one embodiment.

FIG. 9 illustrates a block diagram of the processing device of FIG. 2 with a switch coupled between the antenna to the TX drive circuit and the capacitance measurer according to one embodiment. The processing device of FIG. 2 is modified to include a switch 902 that switches the antenna 908 between the TX drive circuit 212 and a capacitance measurer 904. As described above, the antenna 908 is used as a stylus antenna in a first mode, and as a capacitive sense element in a second mode. The antenna 908 may be the 3-turn coil antenna 508, the 3-turn sliver trace antenna 608, or other types of stylus antennas as would be appreciated by one of ordinary skill in the art having the benefit of this disclosure. The capacitance measurer 904 may be a circuit that is used for measuring the capacitance associated with the antenna 908 when operating as the capacitive sense element. In one embodiment, the capacitance measurer 904 is a circuit that uses charge transfer, charge accumulation, sigma delta modulation, relaxation oscillation, or other capacitance sensing techniques. In one embodiment, the switch 902 connects the antenna 908 to the TX drive circuit 212 during the stylus scan 804 illustrated in FIG. 8) and to the capacitance measurer 904 during the proximity scan during openings 802.

In one embodiment, the TX drive circuit 212 is the source of the TX signal, but could be part of an antenna circuit, which could include a modulator, a filter, or other components as would be appreciated by one of ordinary skill in the art having the benefit of this disclosure.

Figure 10:
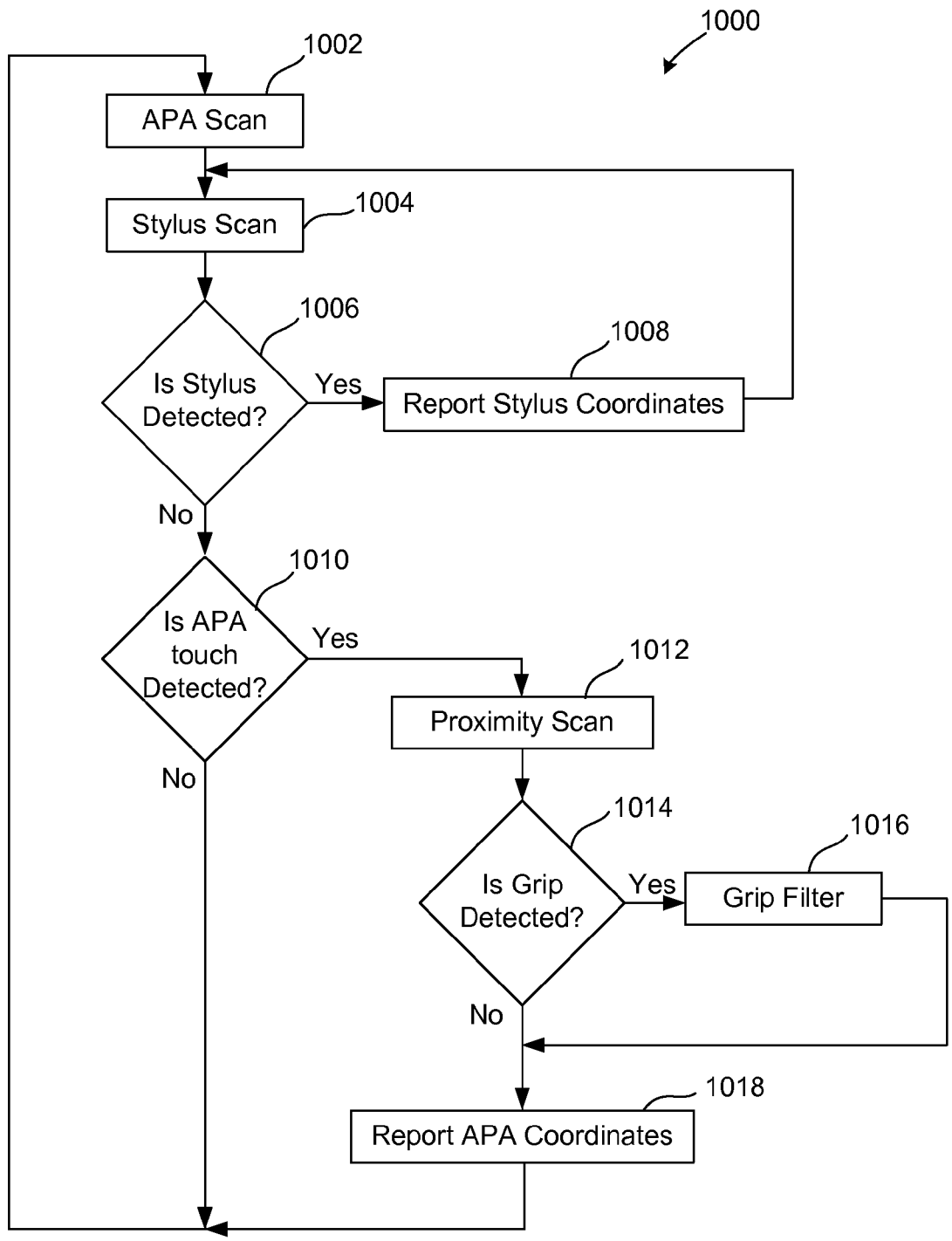
FIG. 10 is a flow chart of one embodiment of a method of stylus scan and proximity detection for grip detection using separated in time scanning.

FIG. 10 is a flow chart of one embodiment of a method of stylus scan and proximity detection for grip detection using separated in time scanning. The method 1000 is performed by processing logic that may comprise hardware (circuitry, dedicated logic, etc.), software (such as is run on a general purpose computing system or a dedicated machine), firmware (embedded software), or any combination thereof. In one embodiment, the processing core 210 of FIG. 2, 4, or 9 performs some of operations of method 1000. In another embodiment, the processing device 110 or 410 of FIGS. 1 and 4, respectively, performs the method 1000. Alternatively, other components of the electronic system 100 (FIG. 1) can perform some or all of the operations of method 1000.

Referring to FIG. 10, the method 1000 begins with performing an APA scan (block 1002), and then a stylus scan (block 1004). The processing logic determines if the stylus is detected (block 1006). If the stylus is detected at block 1006, the processing logic reports the stylus coordinates (block 1008), and returns to perform another stylus scan at block 1004. However, if the stylus is not detected at block 1006, the processing logic determines if a conductive object is detected proximate to the APA array from the APA scan at block 1002 (block 1010). The detection of the conductive object may be when a passive touch object, such as a finger, a passive stylus, or other touch objects is detected proximate to the sense array (referred to as an APA touch). However, it should be noted that the APA touch could also be a hover event. If an APA touch (or hover) is detected at block 1010, the processing logic performs a proximity scan (block 1012). After the proximity scan, the processing logic determines if a grip is detected (block 1014). If so, the processing logic, applies a grip filter (block 1016) to remove any touch coordinates associated with the grip, and reports the APA coordinates (the filtered results) (block 1018). However, if at block 1014 no grip is detected, the processing logic reports the APA coordinates (unfiltered results) (block 1018), and returns to perform another APA scan at block 1002.

Figure 11:
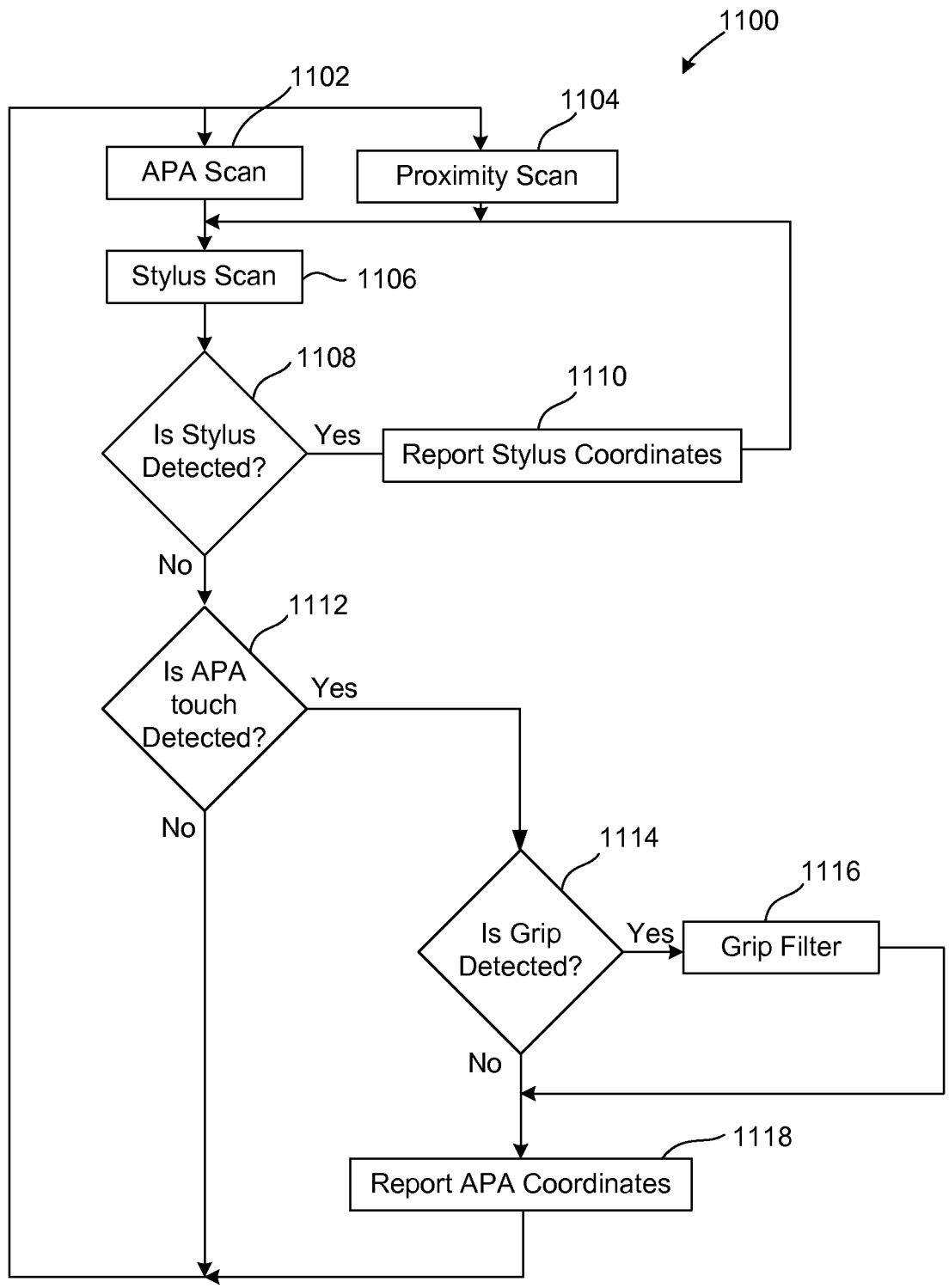
FIG. 11 is a flow chart of one embodiment of a method of stylus scan and proximity detection for grip detection using parallel scanning.

Alternatively, the proximity scans and APA scans can be done concurrently, since the stylus antenna is not used during the APA scan, as described and illustrated in FIG. 11. This time the stylus antenna is not being used can be used for proximity sensor scan in background by the capacitance measurer 904 (e.g., CSD or any other capacitance measurement method). If active stylus is detected, then host scans stylus only. No grip protection may be used in this mode because the active stylus has hardware palm rejection and is not sensitive to grip in principle.

In another embodiment, the processing device includes two scan engines. For example, processing device may include a first scan engine that is a current conveyor that can be used for ITO panel coordinate scans, and a second engine that is a sigma-delta modulator that can be used for proximity sensing. Using this processing device, both the coordinate scanning and the proximity scanning can be done in parallel, such as illustrated in FIG. 11. In this case, the proximity scan may not affect a total report rate since the scans are done in parallel.

FIG. 11 is a flow chart of one embodiment of a method of grip detection using parallel scanning. The method 1100 is performed by processing logic that may comprise hardware (circuitry, dedicated logic, etc.), software (such as is run on a general purpose computing system or a dedicated machine), firmware (embedded software), or any combination thereof. In one embodiment, the processing core 210 of FIG. 2, 4, or 9 performs some of operations of method 1100. In another embodiment, the processing device 110 or 410 of FIGS. 1 and 4, respectively, performs the method 1100. Alternatively, other components of the electronic system 100 (FIG. 1) can perform some or all of the operations of method 1100.

Referring to FIG. 11, the method 1100 begins with performing an APA scan (block 1102) and a proximity scan (block 1104) in parallel. The scans can be performed simultaneously or concurrently. After the proximity and APA scans, the processing logic performs a stylus scan (block 1106). The processing logic determines if the stylus is detected (block 1108). If the stylus is detected at block 1108, the processing logic reports the stylus coordinates (block 1110), and returns to perform another stylus scan at block 1106. However, if the stylus is not detected at block 1108, the processing logic determines if a conductive object is detected proximate to the APA array from the APA scan at block 1102 (block 1112). If an APA touch (or hover) is detected at block 1112, the processing logic determines if a grip is detected (block 1114) from the proximity scan 1104. If so, the processing logic applies a grip filter (block 1116) to remove any touch coordinates associated with the grip, and reports the APA coordinates (the filtered results) (block 1118). However, if at block 1114 no grip is detected, the processing logic reports the APA coordinates (unfiltered results) (block 1118), and returns to perform another parallel APA scan and proximity scan at blocks 1102 and 1104, respectively.

Figure 12:
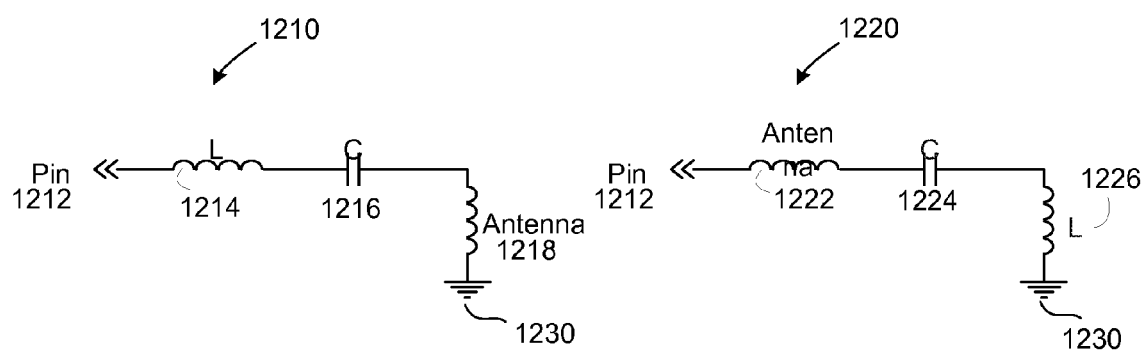
FIG. 12 is a circuit diagram of equivalent circuits of two antenna drive circuits according to one embodiment.

Although FIGS. 11 and 12 show methods for grip protection, in another embodiment, a method may begin with operating a capacitive sense array to detect a conductive object proximate to the capacitive sense array. The processing logic can operate a conductive element disposed adjacent to the capacitive sense array as an antenna in a first mode and then as an additional capacitive sense element in a second mode. The processing logic can switch between the first and second modes. In yet a further embodiment, the antenna may be a stylus antenna, and the processing logic communicates data to or from a stylus via the stylus antenna in the first mode. Then in a second mode, the processing logic can detect the conductive object (finger or stylus) proximate to a periphery area adjacent to the capacitive sense array in which the proximity sensor is disposed using the proximity sensor in the second mode. The processing logic can initiate a grip detection algorithm when the conductive object is detected proximate to the periphery area to determine whether to prevent reporting of touch coordinates of the conductive object.

FIG. 12 is a circuit diagram of equivalent circuits of two antenna drive circuits according to one embodiment. Circuits 1210 and 1220 have simple low pass filters that remove unwanted high frequency harmonics. In circuit 1210, the antenna 1218 is coupled to ground and to a capacitor 1216 and an inductor 1214 in series to pin 1212. When using the antenna as a proximity sensor, as described herein, the proximity sensor operating frequencies are much lower than the TX signal frequency when used as a stylus antenna. Thus, as illustrated in the circuit 1220, the antenna 1222 can be coupled directly to the pin 1212. The antenna 1222 can also be coupled to a capacitor 1224 and an inductor 1226 in series to ground 1230. Since the high frequency filter of circuit 1220 is connected after the antenna 1222, this should not impact the proximity sensing operation, and the same antenna can be used for proximity sensing and RF signal radiation for stylus transmitting.

FIG. 13 illustrates one embodiment of a 3-turn silver trace configured to operate as a proximity sensor for edge protection. The silver trace 608, as described with respect to FIGS. 6 and 7 is configured to operate as a proximity sensor. In this embodiment, the proximity sensor is used for edge protection. The "edge protection" means that no coordinates are reported when the black mask area 507 is touched by the stylus 330.

Figure 26:
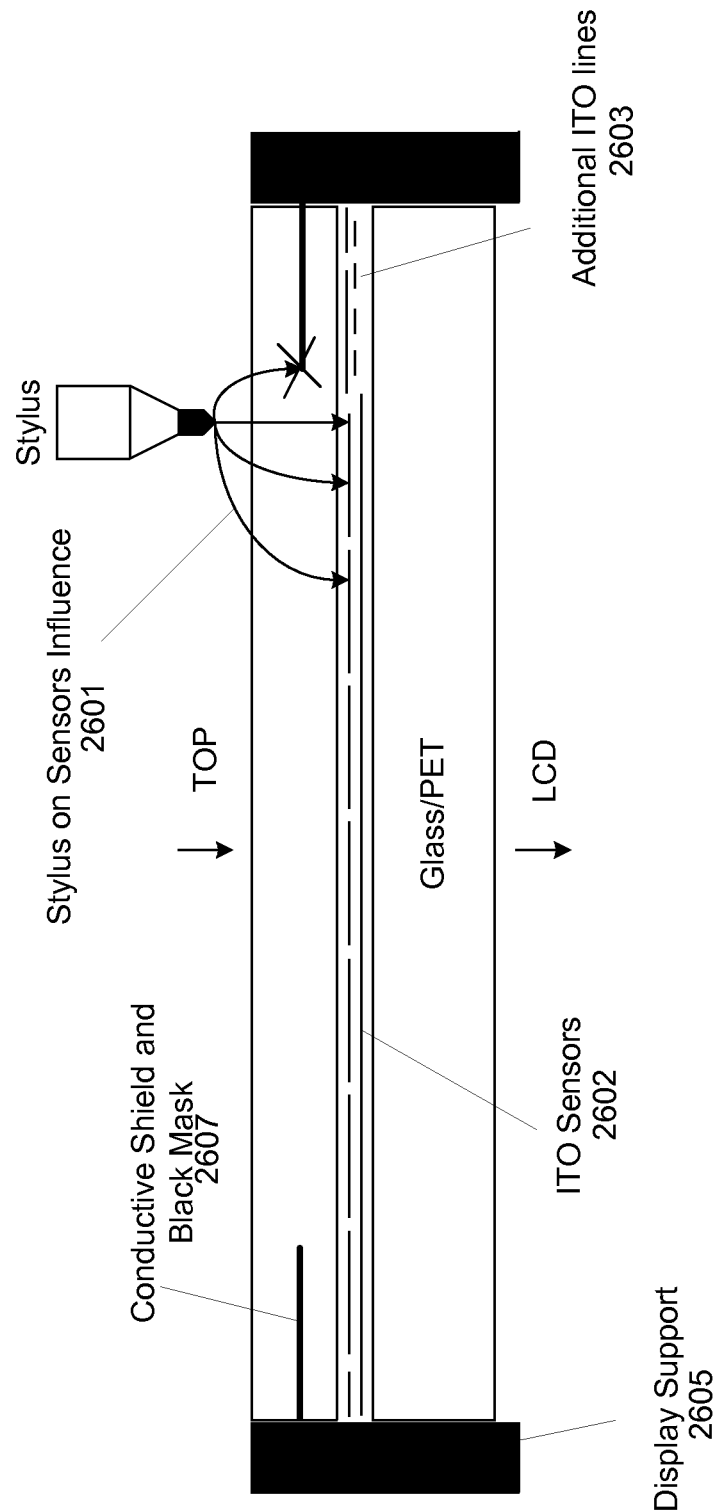
FIG. 26 illustrates a conductive shield and black mask area disposed above ITO sensors and ITO sensor connections.

In some cases, a conductive shield and the black mask area 2607 are disposed above ITO sensors 2602 and ITO sensor connections, as illustrated in FIG. 26. In one embodiment, additional ITO lines 2603 can be disposed around the ITO sensors 2602 and below the black mask to serve as hidden sensors for edge protection. However, the stylus on or near the black mask area cause a stylus on sensors influence 2601 on the additional ITO lines 2603. This may cause false touches. Thus, in another solution, a conductive shield can be disposed behind the black mask area 2607 for edge protection. The shield can be grounded and guards from the stylus tip signal. This shield, however, is not typical for ITO vendors, and adding it increases the cost of the panel. Instead of a conductive shield, edge protection algorithms can be used, such as described with respect to FIG. 15, or additional electrodes in the black mask area. However, unlike solutions that use additional ITO lines, the stylus antenna can be used as the additional electrodes, as described with respect to FIG. 13.

Referring back to FIG. 13, instead of using a shield, the proximity sensor 509, the silver trace antenna 608, or both can be used for edge protection. When the stylus 330 is on or close to the black mask 507 area, there is a stylus on sensor influence 1301. However, data obtained from the proximity sensor 509 and/or the silver trace antenna 608 (when operating as a capacitive sense element and not the stylus antenna) can be used for edge protection. Instead of grounding a conductive shield above the routing lines for edge protection, the stylus antenna (or the proximity sensor 509 or both) can be used as a shield for edge protection. For example, the stylus antenna (or the proximity sensor 509 or both) can be grounded when the influence 1301 is detected on the edge of the ITO sensors 502.

Figure 14:
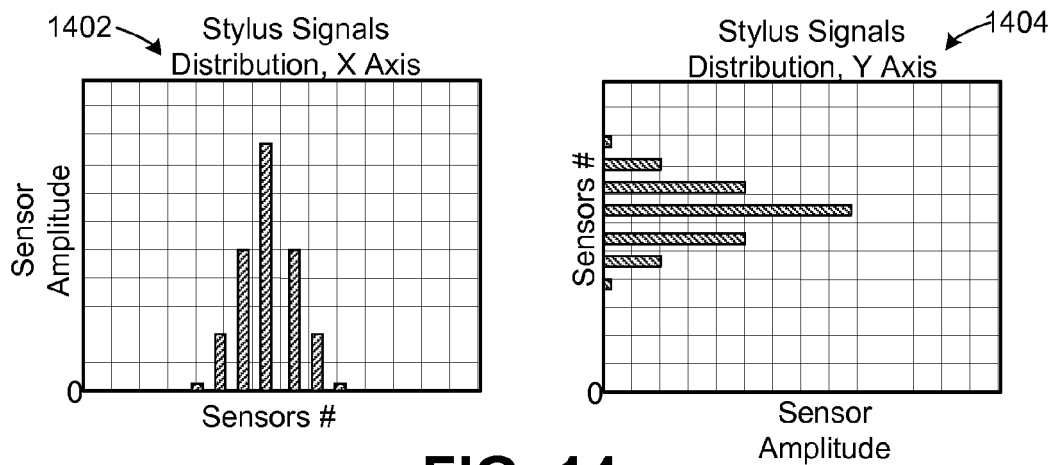
FIG. 14 illustrates two graphs of the stylus signals in an X-axis and in a Y-axis, respectively, according to one embodiment.
Figure 16:
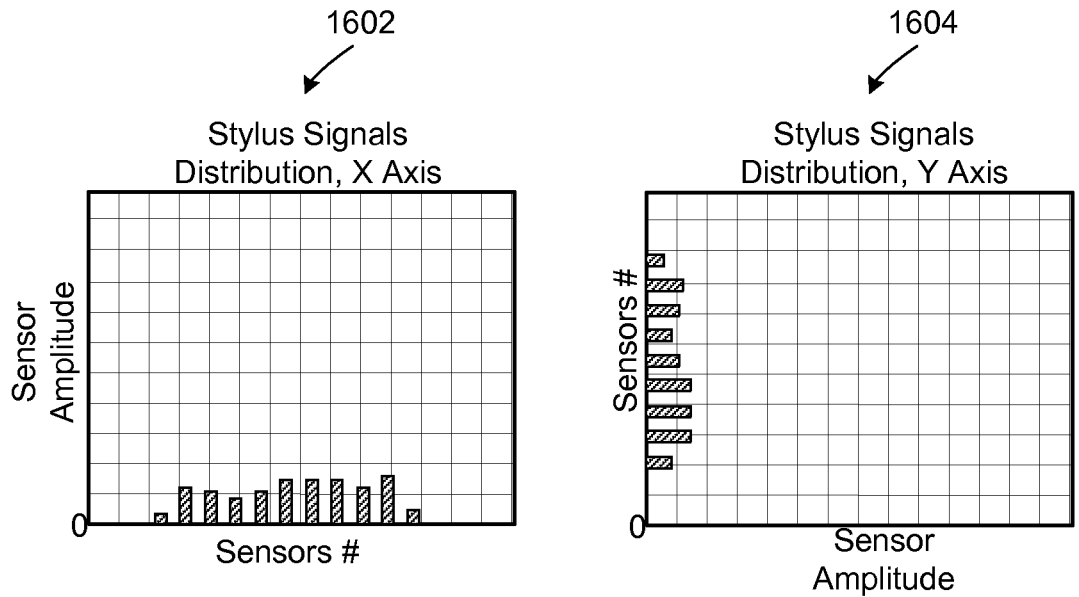
FIG. 16 illustrates two graphs of the stylus signals in the X-axis and in the Y-axis, respectively, when the stylus is in a routing area in a first case according to one embodiment.
Figure 17:
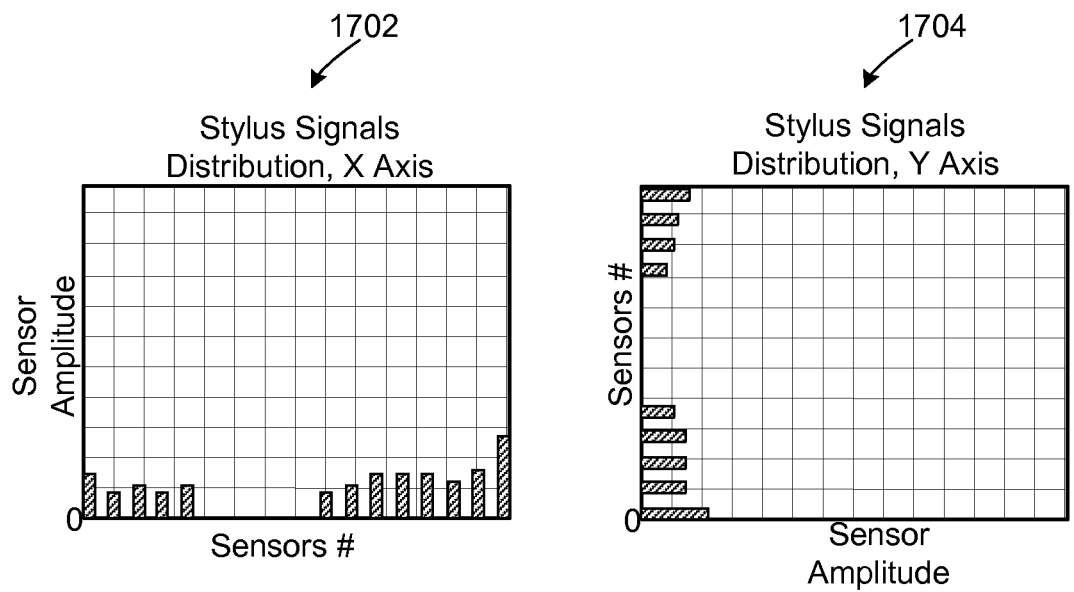
FIG. 17 illustrates two graphs of the stylus signals in the X-axis and in the Y-axis, respectively, when the stylus is in a routing area in a second case according to one embodiment.

FIG. 14 illustrates two graphs of the stylus signals in an X-axis and in a Y-axis, respectively, according to one embodiment. The sensors signal when stylus is on screen area (not on edge) is shown in graphs 1402 and 1404. The graph 1402 shows the stylus signal in the X-axis (rows), and the graph 1404 shows the stylus signal in the Y-axis (columns). The rows and columns signal shapes have a Gaussian shape. The two examples of rows and columns signals when stylus is in black mask area 507 are shown in FIGS. 16 and 17 for comparison. For edge protection, edge protection algorithms may be used, such as described and illustrated with respect to FIGS. 15 and 18.

Figure 15:
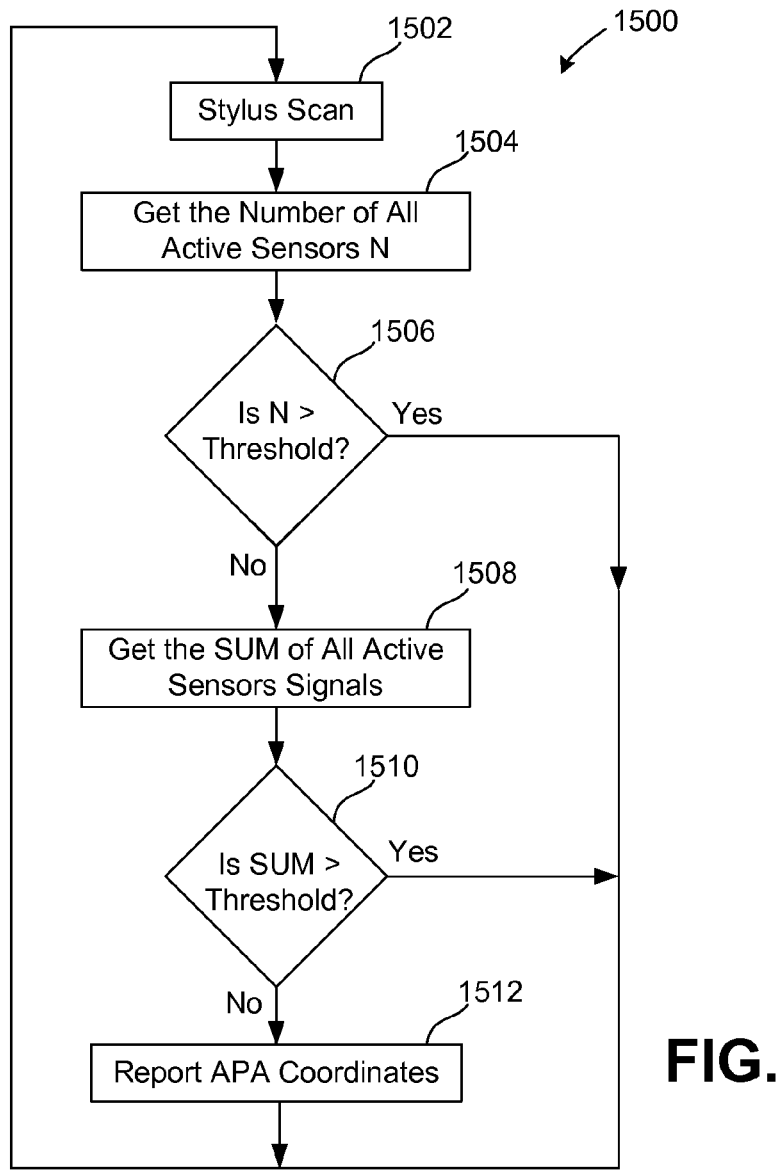
FIG. 15 is a flow chart of one embodiment of a method of edge protection with a signal's sum calculation.

FIG. 15 is a flow chart of one embodiment of a method 1500 of edge protection with a signal's sum calculation. The method 1500 is performed by processing logic that may comprise hardware (circuitry, dedicated logic, etc.), software (such as is run on a general purpose computing system or a dedicated machine), firmware (embedded software), or any combination thereof. In one embodiment, the processing core 210 of FIG. 2, 4, or 9 performs some of operations of method 1500. In another embodiment, the processing device 110 or 410 of FIGS. 1 and 4, respectively, performs the method 1500. Alternatively, other components of the electronic system 100 (FIG. 1) can perform some or all of the operations of method 1500.

Referring to FIG. 15, the method 1500 begins with performing a stylus scan (block 1502). The processing logic gets the number of the active sensors N (block 1504). The processing logic determines whether the number of the active sensors N is greater than a specified threshold (block 1506). If yes, the processing logic returns to perform another stylus scan at block 1502. However, if at block 1506 the number of active sensors N is not greater than the threshold, the processing logic calculates the sum of the active sensor signals (block 1508), and determines if the sum is greater than another specified threshold (block 1510). If yes, the processing logic returns to perform another stylus scan at block 1502. However, if at block 1510 the sum is not great than the second threshold, the processing logic reports the APA coordinates (block 1512), and returns to perform another stylus scan at block 1502.

In short, this method 1500 calculates number of the active sensors and its sum. The stylus touch on black mask area activates mostly all rows or columns up. The stylus touch on ITO area activates some predefined part of sensors. The method 1500 may have an advantage of simplicity and fast execution. This method can provides false touches when stylus is in hover mode behind the routing area. The stylus touch signal is small and the number of active sensors is about the same as when stylus touches the screen center.

In another embodiment, the antenna may be a stylus antenna, and the processing logic communicates data to or from a stylus via the stylus antenna in the first mode. Then in a second mode, the processing logic can detect the conductive object (finger or stylus) proximate to a periphery area adjacent to the capacitive sense array in which the proximity sensor is disposed using the proximity sensor in the second mode. The processing logic can prevent reporting touch coordinates of the conductive object the conductive object is detected proximate to the periphery area.

FIG. 16 illustrates two graphs of the stylus signals in the X-axis and in the Y-axis, respectively, when the stylus is in a routing area in a first case according to one embodiment. The sensors signal when stylus is on routing area is shown in graphs 1602 and 1604. The graph 1602 shows the stylus signal in the X-axis (rows), and the graph 1604 shows the stylus signal in the Y-axis (columns). FIG. 17 illustrates two graphs of the stylus signals in the X-axis and in the Y-axis, respectively, when the stylus is in a routing area in a second case according to one embodiment. The sensors signal when stylus is on routing area is shown in graphs 1702 and 1074. The graph 1702 shows the stylus signal in the X-axis (rows), and the graph 1704 shows the stylus signal in the Y-axis (columns). The rows and columns signal shapes in both cases do not have a Gaussian shape. When in the routing area, most all the rows or columns are activated, unlike the graphs of FIG. 14 that show some of the sensors being activated.

Figure 18:
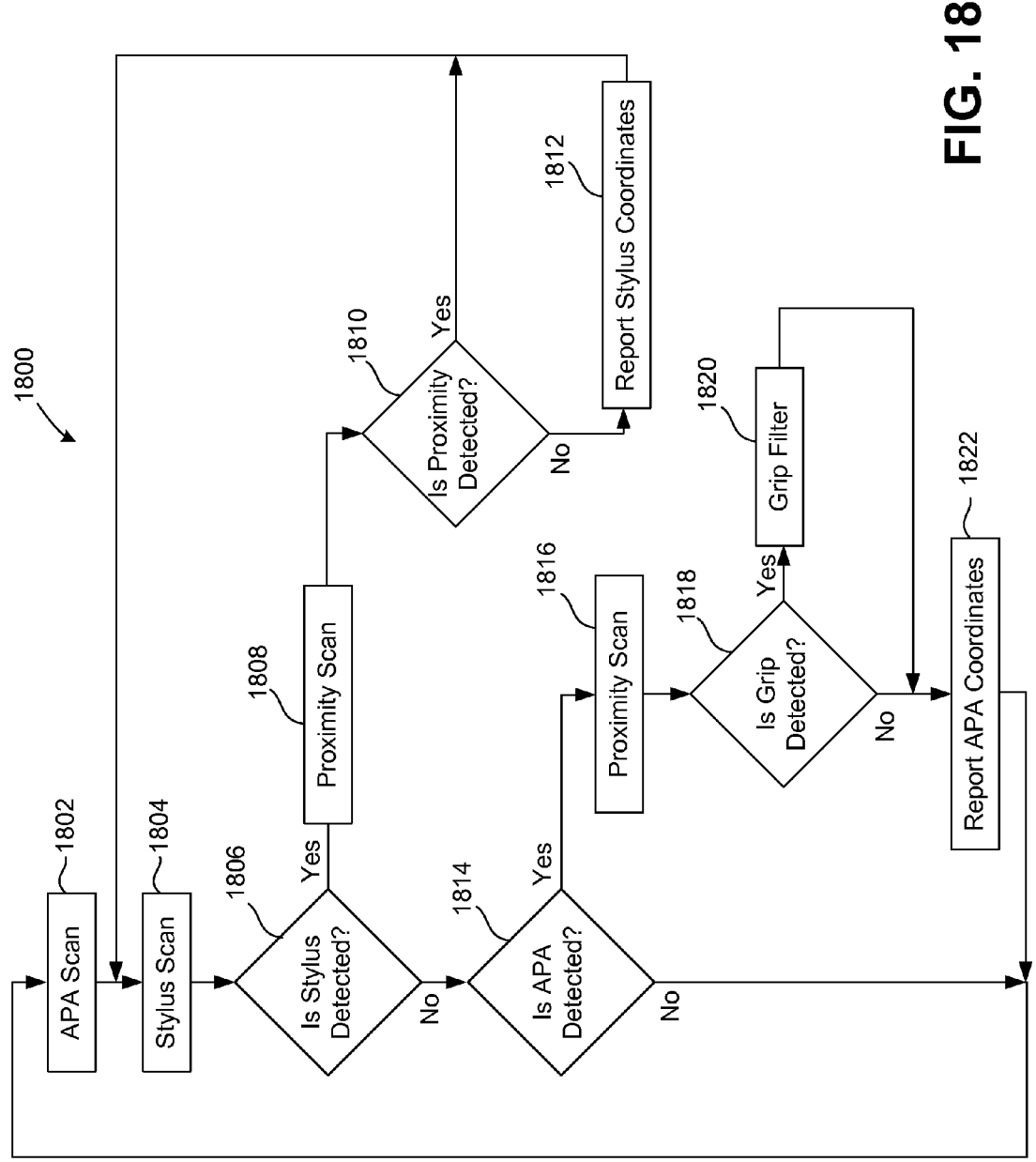
FIG. 18 is a flow chart of one embodiment of a method of edge protection and grip protection.

The second algorithm, illustrated and described with respect to FIG. 18, analyzes stylus touch signal shape. This shape is different for panel touch and black mask area touch. This method is more complicated and gets lot of CPU time. This algorithm may not provide robust protection especially when stylus is on panel corner. Both algorithms work but have some reliability problems especially in hover mode and on panel corners. However, using the stylus antenna as an additional electrode, the additional data from edges only allows makes these algorithms reliable in most conditions. This data is a proximity sensor signal. The proximity sensor scanning during stylus scanning can be used for robust edge protection and edge correction. This sensor should be additionally scanned with main stylus scan same as ITO sensors, such as depicted in FIG. 18. The same scanning channel as for regular ITO sensor may be used for proximity scan. If stylus touches or hovers on black mask area then proximity sensor receives TX signal. The host may determine that stylus is in black mask area and doesn't a report touch coordinates.

FIG. 18 is a flow chart of one embodiment of a method of edge protection and grip protection. The method 1800 is performed by processing logic that may comprise hardware (circuitry, dedicated logic, etc.), software (such as is run on a general purpose computing system or a dedicated machine), firmware (embedded software), or any combination thereof. In one embodiment, the processing core 210 of FIG. 2, 4, or 9 performs some of operations of method 1800. In another embodiment, the processing device 110 or 410 of FIGS. 1 and 4, respectively, performs the method 1800. Alternatively, other components of the electronic system 100 (FIG. 1) can perform some or all of the operations of method 1800.

Referring to FIG. 18, the method 1800 begins with performing an APA scan (block 1802), and then performing a stylus scan (block 1804). The processing logic determines if the stylus is detected (block 1806). If so, the processing logic performs a proximity scan (block 1808) using the stylus antenna (conductive element), and determines if an object is detected in proximity (block 1810). If so, the processing logic returns to perform another stylus scan at block 1804. However, if no proximity event is detected at block 1810, the processing logic reports the stylus coordinates (block 1812), and returns to perform another stylus scan at block 1804. If at block 1806 no stylus is detected, the processing logic determines if an APA touch is detected (block 1814). If yes, the processing logic performs a proximity scan (block 1816), and then determines if a grip is detected (block 1818) from the proximity scan. If so, the processing logic applies a grip filter (block 1820) to remove any touch coordinates associated with the grip, and reports the APA coordinates (the filtered results) (block 1822) and returns to perform another APA scan at block 1802. However, if at block 1818 no grip is detected, the processing logic reports the APA coordinates (unfiltered results) (block 1822), and returns to perform another APA scan at block 1802.

As described above, the stylus antenna may include one, two or three turns. The three turns may be used for bigger screen sizes. So, one turn can be not connected to a transmitter (TX circuit 512) and used as proximity sensor. If three turns are used for transmitting then one additional wire turn in antenna area may be added for edge protection realization. In this embodiment, the proximity sensor 509 labeled in FIG. 13 could be another turn of the stylus antenna. In some scenarios, the existing stylus antenna transmits synchronization signal during stylus scan time and can't be used as proximity sensor. In such cases, the proximity sensor 509 can be placed close to the stylus antenna without serious interferences and without visible border area increasing.

In another embodiment, the proximity scan for grip protection and the proximity scan for edge protection can be done in the same scan or two different scans. In another embodiment, both antenna and dedicated proximity sensor 509 can be used as proximity sensors in APA mode. The dedicated proximity sensor 509 can be scanned in parallel with other channels and doesn't impacts on touch report rate. But the best sensitivity may be achieved when both sensors are connected together.

Figure 19:
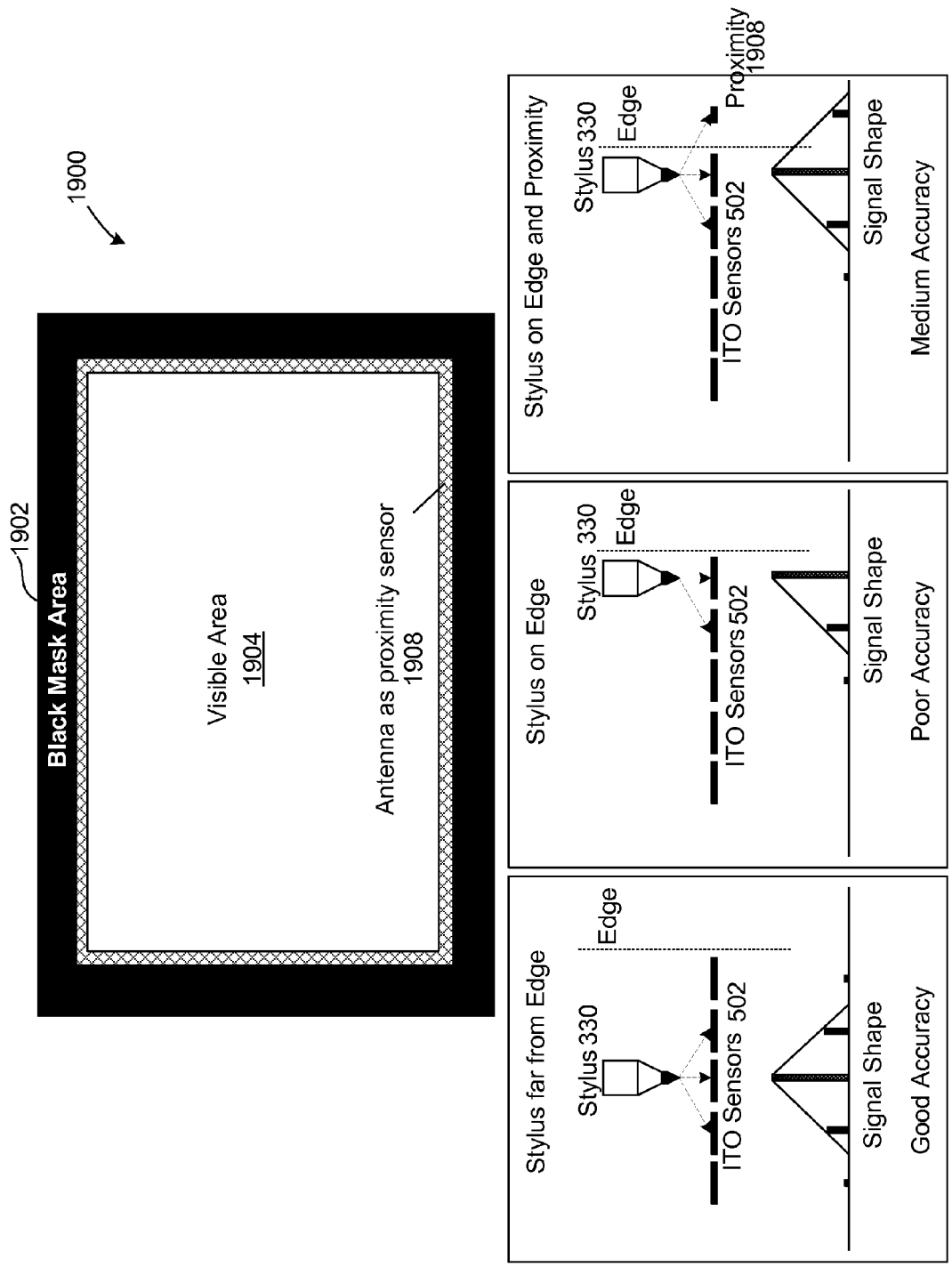
FIG. 19 illustrates a touch surface including a black mask area disposed around a visible area and an antenna used as a proximity sensor for edge accuracy according to one embodiment.

Not only can the stylus antenna be used for edge protection, but can also be used for edge correction, as illustrated in FIG. 19. The "edge correction" is a stylus accuracy improvement procedure on ITO screen edges.

In another embodiment, the antenna may be a stylus antenna, and the processing logic communicates data to or from a stylus via the stylus antenna in the first mode. Then in a second mode, the processing logic can detect the conductive object (finger or stylus) proximate to a periphery area adjacent to the capacitive sense array in which the proximity sensor is disposed using the proximity sensor in the second mode. The processing logic can use a capacitance measured on the proximity sensor for edge correction when the conductive object is detected proximate to the periphery area.

FIG. 19 illustrates a touch surface 190 including a black mask area 1902 disposed around a visible area 1904 and an antenna as a proximate sensor 1908 used as a proximity sensor for edge accuracy according to one embodiment. The stylus accuracy on edges can be improved by using additional electrodes behind the visible area. In this case the additional electrodes are achieved by the antenna as the proximate sensor 1908. Some other solutions include using additional ITO lines behind the black mask area 1902, such as illustrated in FIG. 20.

Figure 20:
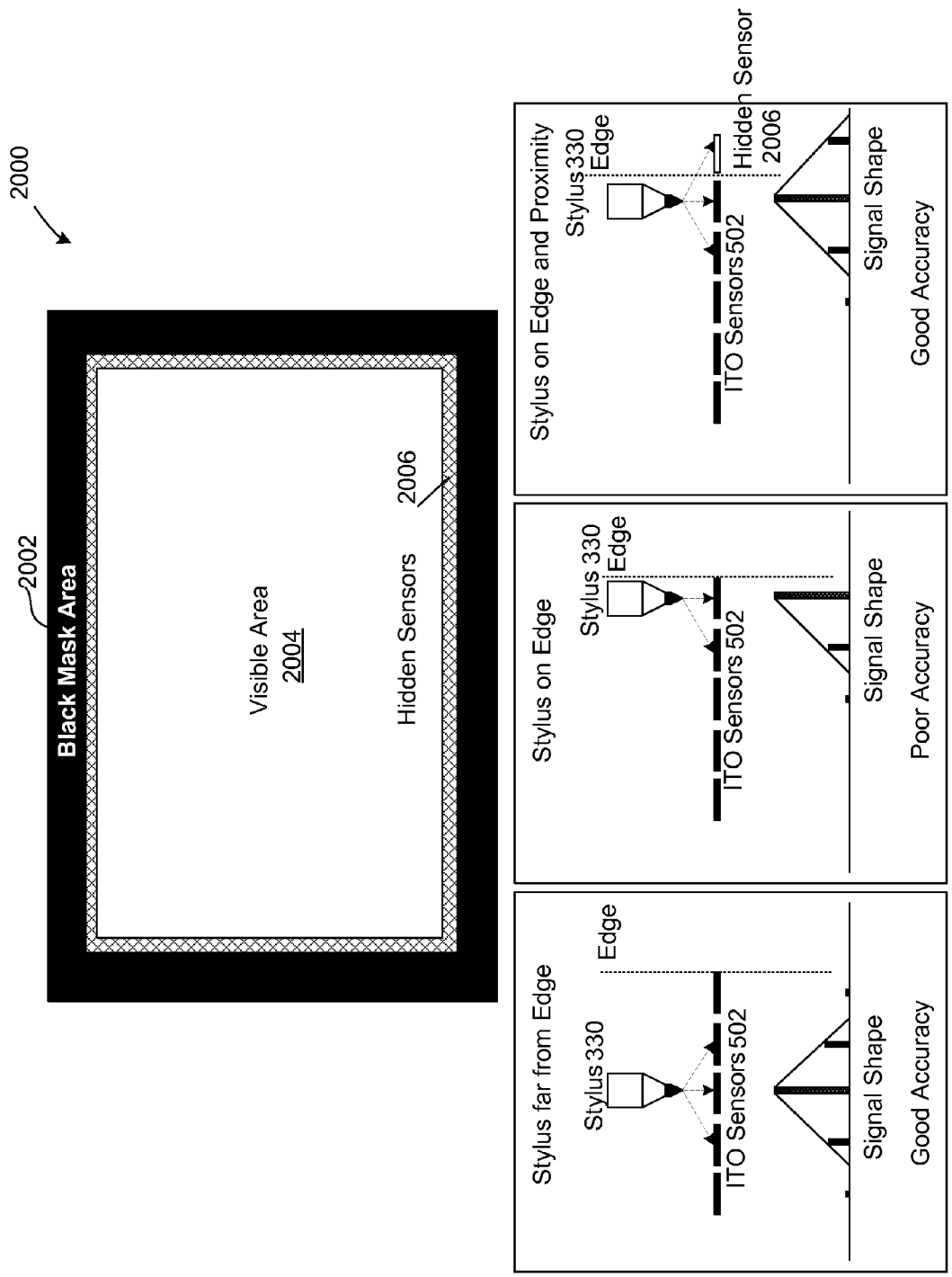
FIG. 20 illustrates a touch surface including a black mask area disposed around a visible area and hidden sensors used for edge accuracy according to another embodiment.

FIG. 20 illustrates a touch surface 2000 including a black mask area 2002 disposed around a visible area 2004 and additional electrodes 2006 as hidden sensors used for edge accuracy according to another embodiment. The additional electrodes 2006 behind the black mask area 2002 can be used in sensing algorithms to achieve edge correction. As shown in FIGS. 19 and 20, when the stylus 330 is far from the edge, the signal has a good shape, which results in good stylus accuracy. When the stylus 330 is on an edge (without any edge correction), the signal does not have a good shape, which results in poor stylus accuracy. When stylus is close to the edge on regular touch screen then there is no enough information for precision position detection. The stylus accuracy on edges can be improved by using additional electrodes behind the visible area, as shown in FIGS. 19 and 20.

Using the hidden sensors illustrated in FIG. 20, the stylus on the edge and proximity can produce a signal with a good shape despite being on the edge or proximity. This results in good stylus accuracy. Similarly, using the stylus antenna as the proximity sensor 1908 illustrated in FIG. 19, the stylus on the edge and proximity can provide a signal with a good shape despite being on the edge or proximity. This also results in good stylus accuracy.

Referring back to FIG. 19, in one embodiment, the proximity sensor information from the proximity sensor 1908 can be used to improve stylus accuracy on edges. The proximity sensor looks like one common electrode in the black mask area 1902. The information from this electrode can be used as one virtual sensor behind the visible area as illustrated in FIG. 19 when the stylus is on the edge and proximity. For example, this information can be used for position correction in the edge correction algorithms, such as firmware algorithms. In one embodiment, the edge correction algorithms may be the same as the edge protection algorithms described above. These algorithms can be combined or performed separately as would be appreciated. Also, the differentiation between edge protection and edge correction algorithms can be done by using algorithms described above.

One possible difference between the hidden sensors and the antenna as proximity sensor 1908 is that the hidden sensors need additional ITO lines and additional pins, which both add to the cost of the device. Also, the size of the black mask area 2002 may be bigger than the black mask area 1902 to accommodate additional ITO sensors and ITO routing lines.

Figure 21:
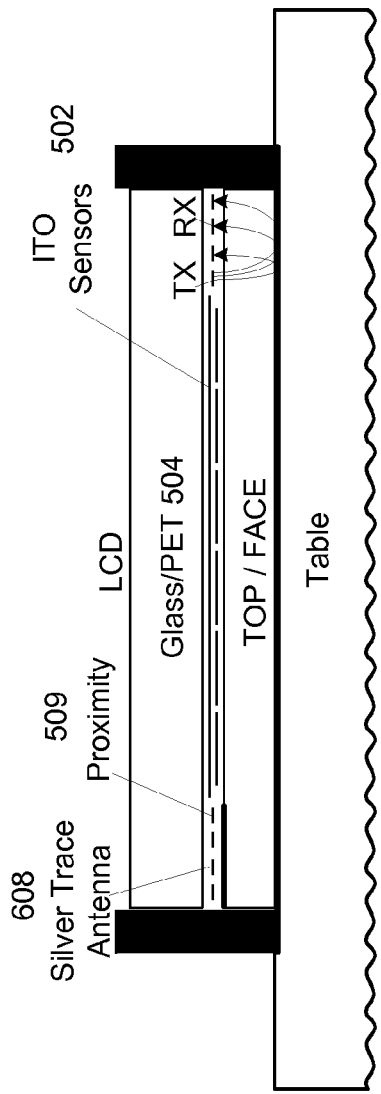
FIG. 21 illustrates one embodiment of a 3-turn silver trace configured to operate as a proximity sensor for face down detection.

FIG. 21 illustrates one embodiment of a 3-turn silver trace configured to operate as a proximity sensor for face down detection. The "face down" detection is option for a device, such as a table, to turn off the screen when the tablet's face is on the table or some other type of surface.

Figure 23:
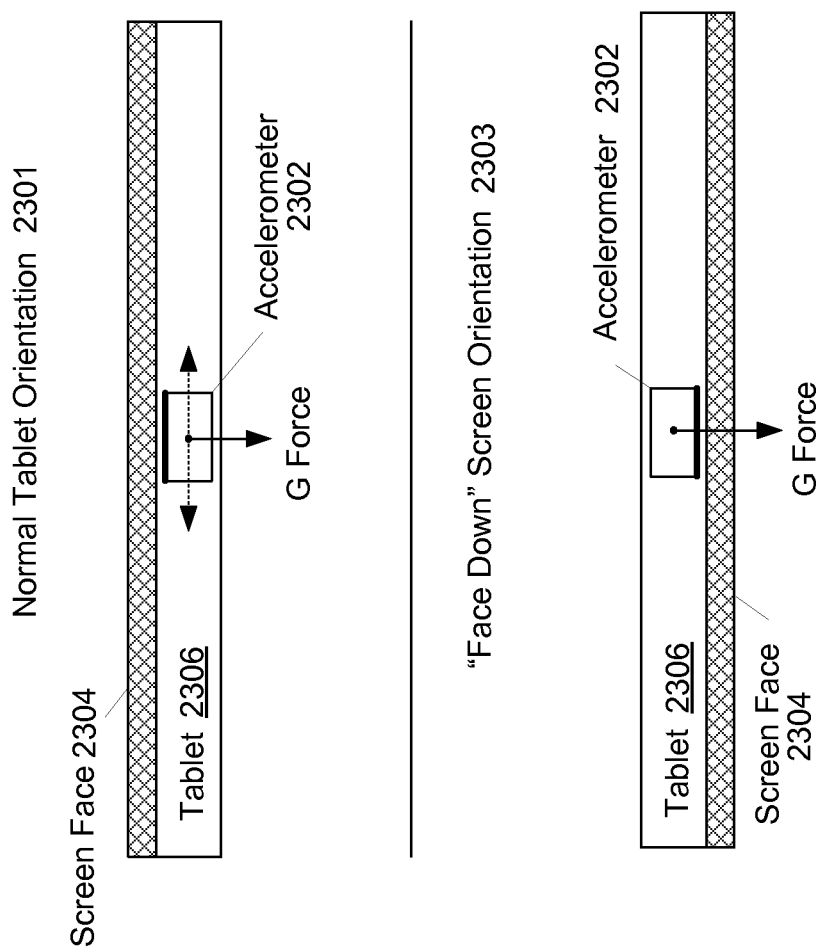
FIG. 23 illustrates an accelerometer used to detect a normal tablet orientation and a face down tablet orientation.

Conventionally, a tablet 2306 would include an accelerometer 2302 to detect a normal tablet orientation 2301 and a face down tablet orientation 2303, as illustrated in FIG. 23. The three axis accelerometer measures the actual device position. In the normal orientation 2301, the screen face 2304 is not facing downward as determined by the accelerometer 2302, such as above or to the side of the tablet 2306. In the face down tablet orientation 2303, the screen face 2304 is below the tablet 2306 as determined by the accelerometer 2302. When device is in "Face Down" mode then the accelerometer indicates that screen may be turned off. The possible disadvantage of this solution is the cost of the accelerometer. Another possible disadvantage is the accelerometers sensitivity to vibrations.

Figure 22:
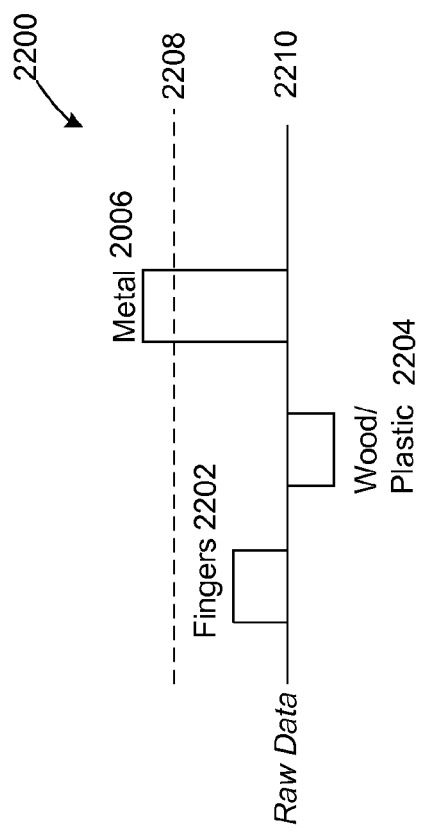
FIG. 22 illustrates touch signals for different face down cases according to one embodiment.

Referring back to FIG. 21, instead of using an accelerometer 2302, the stylus antenna can be used for face down detection. In one embodiment, a mutual capacitance measured between a proximity sensor 509 and the stylus antenna (3-turn silver trace illustrated in FIG. 21) can be used for face down detection. For example, when the device is placed with the screen down against a table, the device should turn off the screen. A human finger detected proximate to the ITO sensors 502 decreases the mutual capacitance between a TX signal driven on the proximity sensor 590 and a RX signal received on the stylus antenna. However, the human finger still generates a positive touch signal, as illustrated as fingers 2202 in FIG. 22. However, if the device is face down on a wood or plastic table, for example, the mutual capacitance is increased, and the raw data goes in the opposite direction (e.g., negative value), as illustrated as wood/plastic 2204 in FIG. 22. When the device is placed face down on a metal table or other large conductive object, for example, the mutual capacitance is decreased in the same direction as the fingers 2202, but the metal table influence on the sensors is much greater than that of the fingers 2202, as illustrated as metal 2206 in FIG. 22. In one embodiment, a first threshold 2208 can be set to distinguish between a finger touch and a larger metal object such as a metal surface. This is due to the bigger touch area. Similarly, a second threshold 2210 can be set to distinguish between a finger touch and a larger wood/plastic object such as a table or other surface. Also, the different thresholds can be applied for face down and grip separation. Alternatively, other thresholds and differentiating techniques may be used to distinguish between these scenarios with the additional data obtained from the proximity sensor 509 and the stylus antenna.

In one embodiment, the existing ITO rows and columns scanning can be used for face down detection also. The antenna can operate on higher frequencies compares to ITO lines. It provides better sensitivity and shorter scanning time. The proximity sensor can be scanned in parallel with APA scan and doesn't affect on touch coordinates report rate. The face down mode is detected then device can goes to sleep for energy saving.

Figure 24:
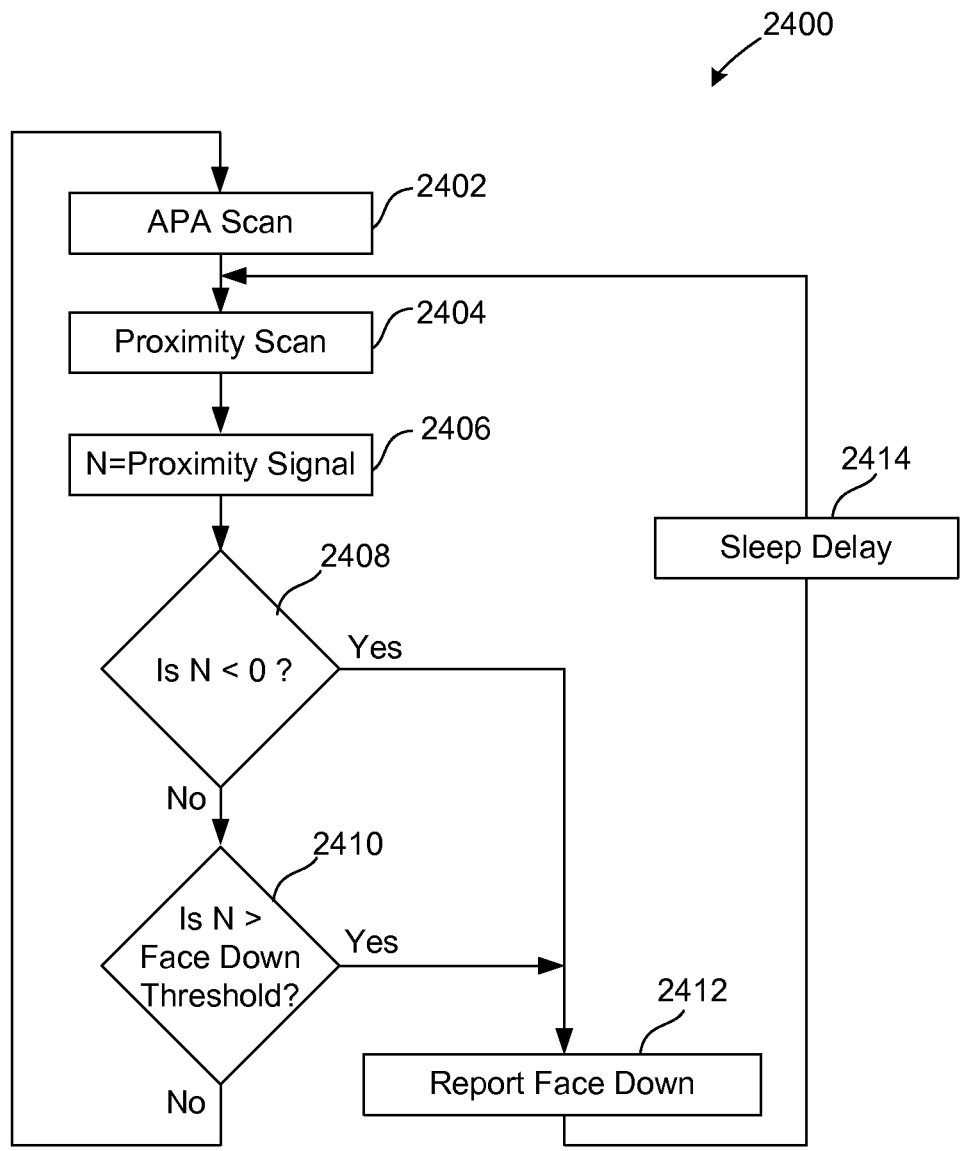
FIG. 24 is a flow chart of one embodiment of a method of face down protection.

FIG. 24 is a flow chart of one embodiment of a method of face down protection. The method 2400 is performed by processing logic that may comprise hardware (circuitry, dedicated logic, etc.), software (such as is run on a general purpose computing system or a dedicated machine), firmware (embedded software), or any combination thereof. In one embodiment, the processing core 210 of FIG. 2, 4, or 9 performs some of operations of method 2400. In another embodiment, the processing device 110 or 410 of FIGS. 1 and 4, respectively, performs the method 2400. Alternatively, other components of the electronic system 100 (FIG. 1) can perform some or all of the operations of method 2400.

Referring to FIG. 24, the method 2400 begins with performing an APA scan (block 2402), and then performing a proximity scan (block 2404). The processing logic sets the proximity signal to a value N (block 2406). The processing logic then determines if the value N is less than zero (or some specified threshold). If so, the processing logic reports a face down condition (block 2412) and may cause the screen to be turned off in a sleep mode for a specified delay (block 2414) before returning to perform another proximity scan at block 2404. However, if at block 2408 the value N is greater than zero, the processing logic determines if the value N is greater than a face down threshold (block 2410). If yes, the processing logic reports a face down condition (block 2412) and may cause the screen to be turned off in a sleep mode for a specified delay (block 2414) before returning to perform another proximity scan at block 2404. However, if at block 2410 the value N is not greater than the face down threshold, the processing logic returns to perform another APA scan at block 2402.

In another embodiment, the antenna may be a stylus antenna, and the processing logic communicates data to or from a stylus via the stylus antenna in the first mode. Then in a second mode, the processing logic can detect the conductive object (finger or stylus) proximate to a periphery area adjacent to the capacitive sense array in which the proximity sensor is disposed using the proximity sensor in the second mode. The processing logic measure a mutual capacitance between the proximity sensor and the second proximity sensor for face-down detection, and turn off a display when the mutual capacitance is above a first threshold or below a second threshold.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other form of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus comprising:
a capacitive sense array comprising a plurality of capacitive sense elements, the plurality of capacitive sense elements configured to detect a conductive object proximate to the capacitive sense array; and
a conductive element disposed adjacent to the capacitive sense array, wherein the conductive element is configured to operate as an antenna in a first mode and as an additional capacitive sense element in a second mode;
a capacitance sensor coupled to the capacitive sense array and selectively coupled to the conductive element in the second mode, wherein the capacitance sensor is configured to measure capacitances associated with the plurality of capacitive sense elements in the first mode and to measure an additional capacitance associated with the conductive element in the second mode; and
a transmitter selectively coupled to the conductive element in the first mode.

2. The apparatus of claim 1, wherein the antenna is a stylus antenna in the first mode, and wherein the stylus antenna comprises a radiating element disposed around at least a portion of the capacitive sense array.

3. The apparatus of claim 2, wherein the radiating element comprises a coil disposed around the capacitive sense array.

4. The apparatus of claim 3, wherein the coil is a three-turn coil.

5. The apparatus of claim 2, wherein the radiating element comprises conductive traces disposed on a common substrate as the plurality of capacitive sense elements of the capacitive sense array.

6. The apparatus of claim 5, wherein the conductive traces are 3-turn silver traces and the capacitive sense array comprises one or more Indium Tin Oxide (ITO) sensors.

7. The apparatus of claim 1, wherein the additional capacitive sense element is configured to operate as a proximity sensor in the second mode.

8. The apparatus of claim 7, further comprising a second capacitive sense element configured to operates as a second proximity sensor in the second mode.

9. The apparatus of claim 7, further comprising a processing device coupled to the capacitive sense array and the conductive element, wherein the processing device comprises the capacitance sensor and the transmitter, wherein the processing device is configured to use the proximity sensor in the second mode to initiate a grip detection algorithm when the processing device detects the conductive object proximate to a periphery area adjacent to the capacitive sense array in which the proximity sensor is disposed.

10. The apparatus of claim 7, further comprising a processing device coupled to the capacitive sense array and the conductive element, wherein the processing device comprises the capacitance sensor and the transmitter, wherein the processing device is configured to use the proximity sensor in the second mode for edge protection to prevent reporting touch coordinates of the conductive object when the processing device detects the conductive object proximate to a periphery area adjacent to the capacitive sense array in which the proximity sensor is disposed.

11. The apparatus of claim 7, further comprising:
a display;
a processing device coupled to the capacitive sense array, the conductive element, and the display, wherein the processing device comprises the capacitance sensor and the transmitter; and
a second proximity sensor, wherein the processing device is configured to use the proximity sensor and the second proximity sensor in the second mode for face-down detection to turn off the display when the processing device determines that a mutual capacitance between the proximity sensor and the second proximity sensor is above a first threshold or below a second threshold.

12. The apparatus of claim 7, further comprising a processing device coupled to the capacitive sense array and the conductive element, wherein the processing device comprises the capacitance sensor and the transmitter, wherein the processing device is configured to use the additional capacitive sense element in the second mode for edge correction when the processing device detects the conductive object proximate to a periphery area adjacent to the capacitive sense array in which the proximity sensor is disposed.

13. The apparatus of claim 1, wherein the conductive object is at least one of an active stylus, a passive stylus, or a finger.

14. A method comprising:
    detecting a conductive object proximate to a capacitive sense array comprising a plurality of capacitive sense elements, wherein detecting the conductive object comprises measuring capacitances associated with the plurality of capacitive sense elements in a first mode;
    communicating data to or from another device using a conductive element disposed adjacent to the capacitive sense array in the first mode at a first time; and
    detecting the conductive object proximate to the conductive element in a second mode at a second time, wherein detecting the conductive object at the second time comprises measuring an additional capacitance associated with the conductive element in the second mode.

15. The method of claim 14, wherein the conductive element is configured as a stylus antenna in the first mode and as a proximity sensor in the second mode, wherein the other device is a stylus, and wherein the method further comprises:
    communicating data to or from the stylus via the stylus antenna in the first mode;
    detecting the conductive object proximate to a periphery area adjacent to the capacitive sense array in which the proximity sensor is disposed using the proximity sensor in the second mode; and
    initiating a grip detection algorithm when the conductive object is detected proximate to the periphery area to determine whether to prevent reporting of touch coordinates of the conductive object.

16. The method of claim 14, wherein the conductive element is configured as a stylus antenna in the first mode and as a proximity sensor in the second mode, wherein the other device is a stylus, and wherein the method further comprises:
    communicating data to or from the stylus via the stylus antenna in the first mode;
    detecting the conductive object proximate to a periphery area adjacent to the capacitive sense array in which the proximity sensor is disposed using the proximity sensor in the second mode; and
    preventing reporting touch coordinates of the conductive object the conductive object is detected proximate to the periphery area.

17. The method of claim 14, wherein the conductive element is configured as a stylus antenna in the first mode and as a proximity sensor in the second mode, wherein the other device is a stylus, and wherein the method further comprises:
    communicating data to or from the stylus via the stylus antenna in the first mode;
    detecting the conductive object proximate to a periphery area adjacent to the capacitive sense array in which the proximity sensor is disposed using the proximity sensor in the second mode;
    measuring a mutual capacitance between the proximity sensor and a second proximity sensor for face-down detection; and
    turning off a display when the mutual capacitance is above a first threshold or below a second threshold.

18. The method of claim 14, wherein the conductive element is configured as a stylus antenna in the first mode and as a proximity sensor in the second mode, wherein the other device is a stylus, and wherein the method further comprises:
    communicating data to or from the stylus via the stylus antenna in the first mode;
    detecting the conductive object proximate to a periphery area adjacent to the capacitive sense array in which the proximity sensor is disposed using the proximity sensor in the second mode; and
    using a capacitance measured on the proximity sensor for edge correction when the conductive object is detected proximate to the periphery area.

19. A device comprising
    a processing device comprising a switch, an antenna circuit, and a capacitance sensor, wherein the switch is configured to couple a conductive element between the antenna circuit and the capacitance sensor, wherein the processing device is configured to communicate data to or from a stylus when the switch is coupled to the antenna circuit and to measure capacitance associated with the conductive element when the switch is coupled to the capacitance sensor.

20. The device of claim 19, further comprising
    an Indium Tin Oxide (ITO) panel comprising ITO sensors coupled to the processing device, wherein the processing device is configured to detect a conductive object proximate to the ITO sensors and
    wherein the conductive element is disposed at least partially around the ITO sensors.

* * * * *